(12) United States Patent
White et al.

(10) Patent No.: US 8,197,778 B2
(45) Date of Patent: Jun. 12, 2012

(54) HANDLING OF ACIDS FROM COMPRESSED OXYFUEL-DERIVED $CO_2$

(75) Inventors: Vincent White, Ashtead (GB); Kevin Boyle Fogash, Wescosville, PA (US); Francis Peter Petrocelli, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 1 day.

(21) Appl. No.: 12/832,095

(22) Filed: Jul. 8, 2010

(65) Prior Publication Data

US 2012/0009105 A1   Jan. 12, 2012

(51) Int. Cl.
*B01D 47/00* (2006.01)
*B01D 53/14* (2006.01)
*B01D 53/52* (2006.01)
*C01B 25/00* (2006.01)

(52) U.S. Cl. .................... 423/210; 423/213.7; 423/246; 423/242.1

(58) Field of Classification Search .................. None
See application file for complete search history.

(56) References Cited

U.S. PATENT DOCUMENTS

| | | | |
|---|---|---|---|
| 3,906,079 A | 9/1975 | Tamaki et al. | |
| 5,348,715 A * | 9/1994 | Chang | 423/235 |
| 7,416,716 B2 * | 8/2008 | Allam et al. | 423/437.1 |
| 7,601,315 B2 * | 10/2009 | Ouimet | 423/228 |
| 2004/0253159 A1 * | 12/2004 | Hakka et al. | 423/228 |
| 2007/0178035 A1 * | 8/2007 | White et al. | 423/248 |
| 2008/0173584 A1 | 7/2008 | White et al. | |
| 2008/0173585 A1 | 7/2008 | White et al. | |
| 2008/0176174 A1 | 7/2008 | White et al. | |
| 2008/0223214 A1 * | 9/2008 | Palamara et al. | 95/160 |
| 2010/0083697 A1 * | 4/2010 | Degenstein et al. | 62/636 |
| 2011/0139046 A1 * | 6/2011 | Fan et al. | 110/204 |

OTHER PUBLICATIONS

Counce, R. M.; "A Literature Review of Nitrogen Oxide Absorption Into Water and Dilute Nitric Acid;" sponsored by an agency of the US Govenment. Aug. 1977.
Dillon, et at; "Oxy-Combustion Processes for CO2 Capture from Advanced Supercritical PF and NGCC Power Plant;" presented at GHGT-7 Vancouver, Sep. 2004.
Jordal; et al; "Oxyfuel Combustion for Coal-Fired Power Generation with CO2 Capture-Opportunities and Challenges;" GHGT-7 Vancouver, 2004.
Wilkinson, et al; "Oxyfuel Conversion of Heaters and Boilers for CO2 Capture;" Second National Conference on Carbon Sequestration; Washington DC; May 5-8, 2003.
Hack et al; "Advanced Oxyfuel Combustion Leading to Zero Emission Power Generation;" 35th International Technical Conference on Clean Coal & Fuel Systems, Florida; (Jun. 6-10, 2010).

(Continued)

*Primary Examiner* — Melvin Mayes
*Assistant Examiner* — Sheng H Davis
(74) *Attorney, Agent, or Firm* — Willard Jones, II

(57) ABSTRACT

Sulfur dioxide ($SO_2$) is removed from a carbon dioxide feed gas by maintaining the feed gas at elevated pressure(s) in the presence of oxygen ($O_2$), water and $NO_x$ for a period of time sufficient to convert $SO_2$ to sulfuric acid and $NO_x$ to nitric acid and produce $SO_2$-depleted, $NO_x$-lean carbon dioxide gas. The invention resides in separating the sulfuric and nitric acids from said $SO_2$-depleted, $NO_x$-lean carbon dioxide gas, and then neutralizing the acids by reaction with an alkaline sorbent in an acid/sorbent reactor system to produce sorbent-derive sulfate. The method has particular application in the removal of $SO_2$ and $NO_x$ from flue gas produced by oxyfuel combustion of a carbonaceous fuel.

21 Claims, 4 Drawing Sheets

OTHER PUBLICATIONS

Keilin et al; "Development of the catalytic chamber process for the manufacture of sulfuric and nitric acids form waste flue gases" prepared for the US Environmental Protection Agency Office 1967-1969 Contract No. PH86-68-75. Relevent pp. 7-20 (IV.A thru IV.G).

Xu et al; "Future CO2 Capture Technology Options for the Canadian Market;" Report No. COAL R309; Mar. 2007; Relevant pp. 137-142 and 178.

Petrocelli et al; U.S. Appl. No. 12/832,096, filed Jul. 8, 2010; "Integration of Catalytic CO2 Oxidation and Oxyfuel Sour Compression."

Petrocelli et al; U.S. Appl. No. 12/832,204, filed on Jul. 8, 2010; "Sorbent Use with Oxyfuel Sour Compression."

Wright et al; U.S. Appl. No. 12/832,156, filed Jul. 8, 2010; "Treatment of Flue Gas From an Oxyfuel Combustion Process"

Wright et al; U.S. Appl. No. 12/832,117, filed Jul. 8, 2010; "Recycle TSA Regen Gas to Boiler for Oxyfuel Operations."

Diamond, Barry Wayne; U.S. Appl. No. 12/832,120; filed Jul. 8, 2010; "Removal of Acid Mists".

* cited by examiner

HANDLING OF ACIDS FROM COMPRESSED OXYFUEL-DERIVED $CO_2$

BACKGROUND OF THE INVENTION

The present invention relates generally to a method for purifying carbon dioxide gas. In particular, the present invention relates to a method for removing sulfur dioxide ($SO_2$) from carbon dioxide gas comprising $SO_2$ as a contaminant. The method also removes $NO_x$, if present as a further contaminant, from the carbon dioxide gas. The invention has particular application in the purification of crude carbon dioxide, e.g. flue gas from an oxyfuel combustion process in a pulverized coal fired power station in which sulfur containing carbonaceous or hydrocarbon fuel is combusted in a boiler to produce steam for electric power generation.

The term "$SO_x$" means oxides of sulfur and includes $SO_2$ and sulfur trioxide ($SO_3$). The term "$NO_x$" means oxides of nitrogen and includes primarily nitric oxide (NO) and nitrogen dioxide ($NO_2$). $NO_x$ may comprise one or more other oxides of nitrogen including $N_2O$, $N_2O_4$ and $N_2O_3$.

It has been asserted that one of the main causes of global warming is the rise in greenhouse gas contamination in the atmosphere due to anthropological effects. The main greenhouse gas which is being emitted, carbon dioxide ($CO_2$), has risen in concentration in the atmosphere from 270 ppm before the industrial revolution to the current figure of about 378 ppm. Further rises in $CO_2$ concentration are inevitable until $CO_2$ emissions are curbed. The main sources of $CO_2$ emission are fossil fuel fired electric power stations and from petroleum fuelled vehicles.

The use of fossil fuels is necessary in order to continue to produce the quantities of electric power that nations require to sustain their economies and lifestyles. There is, therefore, a need to devise efficient means by which $CO_2$ may be captured from power stations burning fossil fuel so that it can be stored rather than being vented into the atmosphere. Storage may be deep undersea; in a geological formation such as a saline aquifer; or a depleted oil or natural gas formation. Alternatively, the $CO_2$ could be used for enhanced oil recovery (EOR).

The oxyfuel combustion process seeks to mitigate the harmful effects of $CO_2$ emissions by producing a net combustion product gas consisting of $CO_2$ and water vapor by combusting a carbonaceous or hydrocarbon fuel in pure oxygen. This process would result in an absence of nitrogen ($N_2$) in the flue gas, together with a very high combustion temperature which would not be practical in a furnace or boiler. In order to moderate the combustion temperature, part of the total flue gas stream is typically recycled, usually after cooling, back to the burner.

An oxyfuel process for $CO_2$ capture from a pulverized coal-fired power boiler is described in a paper entitled "*Oxy-combustion processes for $CO_2$ capture from advanced supercritical PF and NGCC power plants*" (Dillon et al; presented at GHGT-7, Vancouver, Sep. 2004), the disclosure of which is incorporated herein by reference.

Oxyfuel combustion produces raw flue gas containing primarily $CO_2$, together with contaminants such as water vapor; "non-condensable" gases, i.e. gases from chemical processes which are not easily condensed by cooling, such as excess combustion oxygen ($O_2$), and/or $O_2$, $N_2$ and argon (Ar) derived from any air leakage into the system; and acid gases such as $SO_3$, $SO_2$, hydrogen chloride (HCl), NO and $NO_2$ produced as oxidation products from components in the fuel or by combination of $N_2$ and $O_2$ at high temperature. The precise concentrations of the gaseous impurities present in the flue gas depend on factors such as on the fuel composition; the level of $N_2$ in the combustor; the combustion temperature; and the design of the burner and furnace.

In general, the final, purified, $CO_2$ product should ideally be produced as a high pressure fluid stream for delivery into a pipeline for transportation to storage or to site of use, e.g. in EOR. The $CO_2$ must be dry to avoid corrosion of, for example, a carbon steel pipeline. The $CO_2$ impurity levels must not jeopardize the integrity of the geological storage site, particularly if the $CO_2$ is to be used for EOR, and the transportation and storage must not infringe international and national treaties and regulations governing the transport and disposal of gas streams.

It is, therefore, necessary to purify the raw flue gas from the boiler or furnace to remove water vapor; $SO_x$; $NO_x$; soluble gaseous impurities such as HCl; and "non-condensable" gases such as $O_2$, $N_2$ and Ar, in order to produce a final $CO_2$ product which will be suitable for storage or use.

In general, the prior art in the area of $CO_2$ capture using the oxyfuel process has up to now concentrated on removal of $SO_x$ and $NO_x$ upstream of the $CO_2$ compression train in a $CO_2$ recovery and purification system, using current state of the art technology. $SO_x$ and $NO_x$ removal is based on flue gas desulphurization (FGD) schemes such as scrubbing with limestone slurry followed by air oxidation producing gypsum, and $NO_x$ reduction using a variety of techniques such as low $NO_x$ burners, over firing or using reducing agents such as ammonia or urea at elevated temperature with or without catalysts. Conventional $SO_x/NO_x$ removal using desulphurization and $NO_x$ reduction technologies is disclosed in "*Oxyfuel Combustion For Coal-Fired Power Generation With $CO_2$ Capture—Opportunities And Challenges*" (Jordal et al; GHGT-7, Vancouver, 2004). Such process could be applied to conventional coal boilers.

FGD scrubbing schemes typically involve reacting the acid gas, $SO_2$, with an alkaline sorbent material at atmospheric pressure to produce sorbent-derived sulfite. Conventional alkaline sorbents include calcium carbonate (limestone), calcium hydroxide slaked or hydrated lime), and magnesium hydroxide. For example, the reaction taking place in a wet scrubbing process using limestone slurry producing calcium sulfite ($CaSO_3$) can be expressed as:

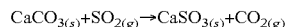

Where the alkaline sorbent used is slaked lime slurry, the reaction taking place also produces calcium sulfite and can be expressed as:

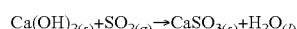

The reaction of magnesium hydroxide with $SO_2$ producing magnesium sulfite may be expressed as:

A solution of sodium hydroxide (NaOH), or caustic soda, may also be used as the alkaline sorbent.

Calcium sulfite is typically converted to the more commercially valuable calcium sulfate dihydrate ($CaSO_4.2H_2O$) or gypsum, by the following "forced oxidation" reaction which takes place in the presence of water:

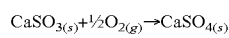

There are many examples of FGD schemes disclosed in the prior art that involve wet scrubbing with alkaline sorbents. An example of one such scheme is disclosed in U.S. Pat. No. 3,906,079 A. All of these schemes appear to operate at atmospheric pressure and produce only the sorbent-derived sulfite in significant quantities. The schemes involve additional processing steps to convert the sorbent-derived sulfite to the corresponding sulfate.

It has been suggested (Hack et al; "*Advanced oxyfuel combustion leading to zero emission power generation*"; 35$^{th}$ Int. Tech. Conf. on Clean Coal & Fuel Systems, Clearwater, Fla., USA; Jun. 6$^{th}$-10$^{th}$ 2010) that natural acidic condensate drained from a carbon dioxide purification unit may be sent to a wet scrubber for capture and neutralization.

A process for the conversion of $SO_x/NO_x$, present in the stack gas of fossil fuel fired boilers, into concentrated sulphuric acid ($H_2SO_4$) and nitric acid ($HNO_3$), respectively, has been developed by Tyco Labs., Inc. and is described in a report titled "*Development of the catalytic chamber process for the manufacture of sulfuric and nitric acids from waste flue gases*" (Keilin et al; Contract number PH86-68-75; Prepared for the US Environmental Protection Agency Office of Air Programs 1967 to 1969). The Tyco process is based on the lead chamber process for sulfuric acid manufacture. In this process, $SO_2$ is oxidized to $SO_3$ by reaction with $NO_2$ (see Equation (a));

$$SO_2 + NO_2 \leftrightarrow SO_3 + NO \quad (a)$$

This reaction is followed by dissolution of the $SO_3$ in water to form sulfuric acid (see Equation (b));

$$SO_3 + H_2O \leftrightarrow H_2SO_4 \quad (b)$$

The NO is reoxidized to $NO_2$ by reaction with oxygen present in the flue gas (see Equation (c));

$$2NO + O_2 \leftrightarrow 2NO_2 \quad (c)$$

In effect, $NO_2$ acts as a gas phase catalyst for reaction (a) as $NO_2$ is regenerated by reaction (c) from the NO produced in reaction (a).

This process would not normally be feasible at atmospheric pressure and with the low concentrations of $NO_x$ present.

A further problem would be the rather slow kinetics of the NO oxidation step. The Tyco process gets over this problem in two ways. First, it increases the $NO_2$ concentration in the stack gas by a factor of about 100 by recycling an $NO_2$-rich gas stream which is mixed with the stack gas prior to $SO_2$ oxidation and $H_2SO_4$ production. The $H_2SO_4$ is recovered in a high temperature scrubber, which allows the bulk of the water vapor in the stack gas to pass through the unit without condensation, producing an acid of about 80% concentration. The $NO_2$ and NO react with the sulfuric acid to form nitrosyl sulfuric acid so that about 90% of the $NO_x$ present in the flue gas is removed together with virtually all of the $SO_x$ (see Equation (d)).

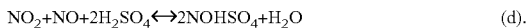

$$NO_2 + NO + 2H_2SO_4 \leftrightarrow 2NOHSO_4 + H_2O \quad (d)$$

Secondly, the slow oxidation of NO to $NO_2$ is speeded up by passing the nitrosyl sulfuric acid through a stripper tower which is swept by a small side-stream of the flue gas feed which provides the $O_2$ needed for net NO oxidation to $NO_2$. The oxidation reaction in the stripper tower is assisted by an active carbon catalyst which circulates in the liquid phase.

US 2007/0122328 A1 (granted as U.S. Pat. No. 7,416,716 B1) discloses the first known method of removing $SO_2$ and $NO_x$ from crude carbon dioxide gas produced by oxyfuel combustion of a hydrocarbon or carbonaceous fuel, in which the removal steps take place in the $CO_2$ compression train of a $CO_2$ recovery and purification system. This process is known as a "sour compression" process since acid gases are compressed with carbon dioxide flue gas. The method comprises maintaining the crude carbon dioxide gas at elevated pressure(s) in the presence of $O_2$ and water and, when $SO_2$ is to be removed, $NO_x$, for a sufficient time to convert $SO_2$ to sulfuric acid and/or $NO_x$ to nitric acid; and separating said sulfuric acid and/or nitric acid from the crude carbon dioxide gas.

There is a continuing need to develop new methods for removing $SO_x$ and, where present, $NO_x$ from carbon dioxide gas, and particularly from crude carbon dioxide gas such as flue gas produced in an oxyfuel combustion process such as that involved in a pulverized coal-fired power boiler.

BRIEF SUMMARY OF THE INVENTION

It is an object of the present invention to develop a new method for removing $SO_2$ and, where present, NO from carbon dioxide gas, particularly from flue gas from an oxyfuel combustion process.

It is a further object of the present invention to use acid condensate produced in a sour compression process and thereby reduce or even eliminate the amount of waste acid condensate that must be treated before disposal.

It is an object of preferred embodiments of the present invention to reduce the size of, or even eliminate, (i) conventional FGD systems to remove $SO_2$, and/or (ii) conventional SCR systems to remove $NO_x$, when designing new oxyfuel combustion systems for power generation.

It is a further object of preferred embodiments of the present invention to provide a system that may be conveniently retro-fitted to air fired combustion systems for power generation that are being converted to oxyfuel combustion.

It is another object of preferred embodiments of the present invention to replace large low pressure FGD units with smaller and more efficient continually stirred tank reactors.

According to a first aspect of the present invention, there is provided a method for removing $SO_2$ from carbon dioxide feed gas comprising $SO_2$ as a contaminant, said method comprising:

maintaining said carbon dioxide feed gas, or a $SO_2$-lean carbon dioxide gas derived therefrom, at elevated pressure(s) in a sour gas reactor system in the presence of $O_2$, water and $NO_x$ for a period of time sufficient to convert $SO_2$ to sulfuric acid condensate and $NO_x$ to nitric acid condensate;

separating said acid condensates from said carbon dioxide gas to produce $SO_2$-depleted, $NO_x$-lean carbon dioxide gas; and neutralizing at least a portion of said sulfuric acid condensate by reaction with an alkaline sorbent in an acid/sorbent reactor system to produce sorbent-derived sulfate.

The invention not only provides a new way of removing $SO_2$ and, if present, NO from carbon dioxide gas, but also reduces or even eliminates the amount of waste acid condensate from a sour compression process that must be treated before disposal. In addition, new oxyfuel combustion system may be designed with a combination of a sour gas reactor system with a FGD unit and/or SCR unit which may be optimized to improve overall efficiency. Further, the invention may be easily and conveniently retro-fitted to an existing FGD unit, for example, in an air-fired combustion system converted to oxyfuel combustion.

According to a second aspect of the present invention, there is provided apparatus for removing $SO_2$ from a carbon dioxide feed gas comprising $SO_2$ as a contaminant, said apparatus comprising:

a sour gas reactor system for maintaining said carbon dioxide feed gas, or a $SO_2$-lean carbon dioxide gas derived therefrom, at elevated pressure(s) in the presence of $O_2$, water and $NO_x$ for a period of time sufficient to convert $SO_2$ to sulfuric acid condensate and $NO_x$ to nitric acid condensate;

a first separation system for separating said acid condensates from said carbon dioxide gas to produce $SO_2$-depleted, $NO_x$-lean carbon dioxide gas;

an acid/sorbent reactor system for neutralizing at least a portion of said sulfuric acid condensate by reaction with an alkaline sorbent to produce sorbent-derived sulfate; and a conduit arrangement for feeding said sulfuric acid condensate from said first separation system to said acid/sorbent reactor system.

DETAILED DESCRIPTION OF THE INVENTION

Figure 1:
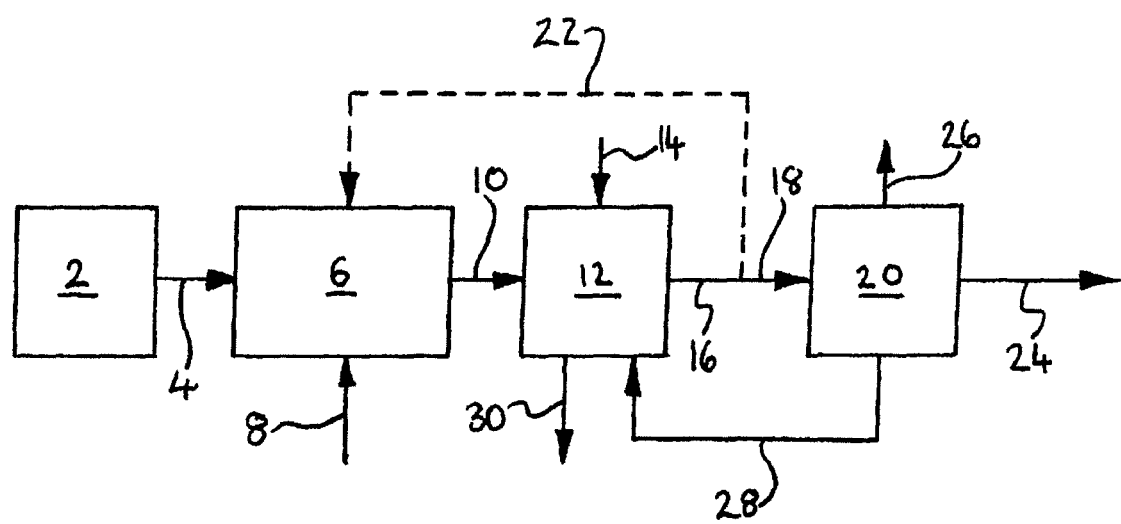
FIG. 1 is a flow sheet depicting an embodiment of the present invention involving a conventional low pressure FGD unit.

The method comprises maintaining the carbon dioxide feed gas, or a $SO_2$-lean carbon dioxide gas derived therefrom, at elevated pressure(s) in a sour gas reactor system in the presence of $O_2$, water and $NO_x$ for a period of time sufficient to convert $SO_2$ to sulfuric acid condensate and $NO_x$ to nitric acid condensate. The acid condensates are separated from the carbon dioxide gas to produce $SO_2$-depleted, $NO_x$-lean carbon dioxide gas and at least a portion of the sulfuric acid condensate is neutralized by reaction with an alkaline sorbent in an acid/sorbent reactor system to produce sorbent-derived sulfate.

The method is primarily intended as an alternative or improved method to that disclosed in US 2007/0122328 A1 for removing $SO_2$ and $NO_x$ from flue gas generated by oxyfuel combustion of a hydrocarbon or carbonaceous fuel, in or downstream of, a $CO_2$ compression train in a $CO_2$ recovery and purification system.

It should be noted that the percentages indicated for the various components in gas streams discussed below are approximate molar percentages (mol. %) calculated on a dry basis. In addition, all pressures provided below are absolute pressures and not gauge pressures.

The method typically removes over 80% of the $SO_2$ contaminant in the carbon dioxide feed gas and, in most embodiments, the method removes over 90% of the $SO_2$ contaminant in the feed gas. In some embodiments, the method removes substantially all (e.g. >95%) of the $SO_2$ contaminant in the carbon dioxide feed gas to produce a substantially $SO_x$-free carbon dioxide gas.

The method is suitable to purify carbon dioxide containing $SO_2$ as a contaminant from any source. However, in preferred embodiments, the carbon dioxide gas is, or is derived from, flue gas produced by combustion of a fuel selected from the group consisting of hydrocarbon fuels such as natural gas, and carbonaceous fuels such as coal. The method has particular application for removing $SO_2$ from flue gas produced by oxyfuel combustion of a sulfur-containing fuel, particularly coal.

Flue gas generated in an oxyfuel combustion process usually contains carbon dioxide as the major component, with $SO_x$, $NO_x$ and the non-condensable gases $O_2$, $N_2$, Ar, Kr and Xe. $SO_x$ is produced by the combustion of elemental sulfur and/or sulfur-containing compounds present in the fuel. $O_2$ is present in the flue gas from excess $O_2$ used in the combustion and from air ingress into the combustion unit which is also responsible for the presence of $N_2$, Ar, Kr and Xe in the flue gas. $NO_x$ is produced by reaction $N_2$ with $O_2$ in the combustion unit.

Further components in the flue gas include solid particulates such as fly ash and soot; water; CO; HCl; $CS_2$; $H_2S$; HCN; HF; volatile organic compounds (VOCs) such as $CHCl_3$; metals including mercury, arsenic, iron, nickel, tin, lead, cadmium, vanadium, molybdenum and selenium; and compounds of these metals.

Flue gas from the combustor is typically washed with water to remove particulates (such as soot and/or fly ash) and water soluble components (such as HF, HCl and/or $SO_3$). Additionally, the flue gas may be filtered, using equipment such as a baghouse or electrostatic precipitator, to enhance particulate removal. Since the flue gas is typically at atmospheric pressure, it is then compressed after washing to the elevated pressure to form the carbon dioxide feed gas to be purified by the method. However, if the feed gas originates from a source, such as a pressurized oxyfuel combustion system, that is already at the required elevated pressure, then compression is not required.

Where the carbon dioxide gas is produced in an oxyfuel combustion process, the method usually involves the combustion of the fuel in pure $O_2$ or an $O_2$-rich gas, e.g. a gas comprising at least 80% $O_2$, optionally with recycled flue gas from the combustion process to moderate the temperature of combustion and control heat flux.

The method may be used to remove $SO_2$ and, if present, NO from carbon dioxide feed gas having a flow rate from 200 kmol/h to 40,000 kmol/h which flow rates are typical for flue gas generated in an oxyfuel combustion process.

The method may be used to remove $SO_2$ from a stream of otherwise pure $CO_2$ gas. However, the method has particular application in removing $SO_2$ from "impure" carbon dioxide gas, e.g. carbon dioxide gas having from about 90% to about 95% $CO_2$, and more particularly in removing $SO_2$ from "crude" carbon dioxide gas, e.g. carbon dioxide feed gas having from about 40% to about 90% $CO_2$, such as flue gas from an oxyfuel combustion process. In preferred embodiments, the carbon dioxide feed gas has from about 60% to about 90% $CO_2$; and preferably from about 65% to about 85% $CO_2$.

The amount of $SO_2$ contaminant in the feed gas, or in the $SO_2$-lean carbon dioxide gas derived therefrom, is usually more than 50 ppm. The amount of $SO_2$ contaminant is usually no more than about 10,000 ppm. The amount of $SO_2$ contaminant is typically from about 100 ppm to about 5,000 ppm.

The term "elevated pressure" is intended to mean a pressure that is significantly greater than atmospheric pressure. For example, the term is intended to exclude minor elevations in pressure over atmospheric pressure, such as those elevations provided by a blower or fan in order to force a gas through apparatus operating at about atmospheric pressure. Such minor pressure elevations are considered to be insignificant in the context of the present invention.

The elevated pressure(s) is usually at least 2 bar (0.2 MPa), e.g. at least 3 bar (0.3 MPa), or at least 5 bar (0.5 MPa). The elevated pressure(s) is usually no more than about 100 bar (10 MPa) and preferably no more than about 50 bar (5 MPa). The elevated pressure(s) may be from about 3 bar to about 50 bar (0.3 MPa to 5 MPa), e.g. from about 5 bar to about 50 bar (0.5 MPa to 5 MPa), or from about 10 bar to about 40 bar (1 MPa to 4 MPa).

In some embodiments, the carbon dioxide feed gas comprising $SO_2$ as a contaminant may already be at an elevated pressure, e.g. flue gas from a pressurized oxyfuel combustion system. However, in most embodiments, the carbon dioxide gas is compressed to produce the carbon dioxide feed gas at said elevated pressure(s). The gas may be compressed in a single stage or in more than one stages, with or without interstage cooling using heat exchangers. If interstage cooling is used, then means (e.g. "knockout" pots) may be provided to capture and remove any condensate that is formed during the compression step.

The sour gas reactor system comprises at least one stage operating at an elevated pressure. In some embodiments, the sour gas reactor has at least two stages, a first stage operating at a first elevated pressure and a second stage operating at a second elevated pressure that is higher than the first elevated pressure. In preferred embodiments, the sour gas reactor system comprises two such stages. Both the first and second elevated pressures are usually within the preferred ranges for elevated pressure(s) given above. The first elevated pressure may be from about 10 bar (1 MPa) to about 20 bar (2 MPa). The second elevated pressure may be from about 25 bar (2.5 MPa) to about 35 bar (3 MPa).

Where the sour gas reactor has at least two stages operating at different elevated pressures, a compression system is provided to compress the gas from the first elevated pressure to the second elevated pressure. The compression system may be a single stage compressor but, in preferred embodiments, the compression system comprises at least one stage of a multistage carbon dioxide compression train.

If $O_2$ is not present in the feed gas as a contaminant, or if insufficient $O_2$ is present, additional $O_2$ may be added to the carbon dioxide feed gas from an external source to enable conversion $SO_2$ to sulfuric acid condensate and $NO_x$ to nitric acid condensate. However, in embodiments where the carbon dioxide feed gas is, or is derived from, flue gas from an oxyfuel combustion process, $O_2$ is usually not only present in the carbon dioxide feed gas as a further contaminant (see above) but also in a sufficient quantity such that additional $O_2$ from an external source is not typically required. The amount of $O_2$ in the feed gas is usually from about 0.1% to about 15%, e.g. from about 1% to about 8%, of the feed gas.

If water is not present in the feed gas as a contaminant, or if insufficient water is present, additional water may be added to the carbon dioxide feed gas from an external source to enable conversion of $SO_2$ to sulfuric acid condensate and $NO_x$ to nitric acid condensate. In embodiments where the carbon dioxide feed gas is, or is derived from, flue gas from an oxyfuel combustion process, water is usually present in the carbon dioxide feed gas as a further contaminant (see above). However, where the flue gas is generated by oxyfuel combustion of a carbonaceous fuel containing a high sulfur concentration, additional water may be need to be added to the sour gas reactor system. Water would be added to the carbon dioxide gas feed to the sour gas reactor system in embodiments in which the feed gas is pre-treated by contact with an alkaline sorbent, either in the form of an aqueous solution or an aqueous slurry, in a desulfurization unit.

The present invention works with concentrations of $NO_x$ as low as about 100 ppm. The concentration of $NO_x$ is usually from about 100 ppm to about 10,000 ppm. The carbon dioxide feed gas usually comprises $NO_x$ as a further contaminant (see above) in these concentrations. However, in embodiments where the carbon dioxide feed gas does not comprise $NO_x$ as a further contaminant, the method comprises adding to sour gas reactor system at least the minimum amount of $NO_x$ required to provide significant assistance in converting $SO_2$ to sulfuric acid. In these embodiments, the amount of $NO_x$ added may be from about 100 ppm to about 10,000 ppm.

Where the feed gas comprises $NO_x$ as a further contaminant, the method typically removes at least 30%, e.g. at least 40% and, in some embodiments, at least 50%, of the $NO_x$ contaminant. In some embodiments, the method removes from 30% to about 90%, e.g. from about 35% to 80%, of the $NO_x$ contaminant.

In preferred embodiments, $NO_x$, $O_2$ and water are present as further contaminants in the carbon dioxide feed gas, with or without the addition of further $NO_x$ and/or $O_2$ and/or water from external sources.

Regarding the reactions in the sour gas reactor system, $NO_x$ is converted to nitric acid and $SO_2$ is converted to sulfuric acid, in the presence of $O_2$ and water, by the following series of reactions which are referred to herein as "sour compression" reactions:

$$2NO + O_2 \leftrightarrow 2NO_2 \tag{i}$$

$$2NO_2 + H_2O \leftrightarrow HNO_2 + HNO_3 \tag{ii}$$

$$3HNO_2 \leftrightarrow HNO_3 + 2NO + H_2O \tag{iii}$$

$$NO_2 + SO_2 \leftrightarrow NO + SO_3 \tag{iv}$$

$$SO_3 + H_2O \rightarrow H_2SO_4 \tag{v}$$

Following extensive studies (Counce, R. M. (1977), "*A literature review of nitrogen oxide absorption into water and dilute nitric acid*", Technical Report ORNL/TM-5921, Oak Ridge National Laboratory), it has been determined that the rate of reaction (i) is increased as the reaction pressure increases. The Inventors realized that carrying out the present method at elevated pressure improves the rate of reaction (i). In particular, the elevated pressure in these embodiments is preferably at least about 3 bar (0.3 MPa), which the Inventors have determined is the pressure threshold at which the rate of reaction (i) becomes commercially more useful.

Further details of the sour compression reactions are provided in US 2007/0122328 A1, the disclosure of which is incorporated herein by reference.

Residence time in sour gas reactor system (i.e. contact time or "hold up" time) determines the degree or extent of the sour compression reactions. In this connection, the period of time required for converting NOx to nitric acid is typically longer than that required for converting SO2 to sulfuric acid. The period of time is usually more than 5 s, e.g. more than about 10 s or more than about 20 s. The period of time is usually no more than 1000 s, and preferably no more than 600 s. The period of time may be from 5 s to about 600 s, e.g. from about 10 s to about 500 s or from about 15 s to about 200 s. In embodiments in which the sour compression reactions take place in more than one stage, this period of time is the total residence time in all stages combined. For example, where the sour compression reactions take place in two stages, the period of time in the first stage may be from about 2 s to 100 s, and the period of time in the second stage may be from about 2 s to about 100 s.

The sour gas reactor system operates at a temperature that is below the acid dew point in order to produce the acid condensates and typically at or above the temperature of cooling water. The "acid dew point" is a conventional term in the art referring to the temperature at which reaction conditions favor production of inorganic acid as a liquid, for example from the gas phase equilibrium reaction of $SO_3$ and water. The acid dew point is dependent on pressure and the concentration of other components such as $SO_3$ (and $NO_x$), and a higher pressure (or a higher concentration of the other component(s)) means a higher dew point. Table 1 provides some examples from the literature (Oil & Gas Journal; Vol. 108; Issue 7; 22 Feb. 2010) of how acid dew point varies with pressure, water and $SO_3$ concentrations.

TABLE 1

| Pressure bar (MPa) | Dew point (° C.) 5% $H_2O$; 5,000 ppm $SO_3$ | Dew point (° C.) 20% $H_2O$; 5,000 ppm $SO_3$ | Dew point (° C.) 5% $H_2O$; 10,000 ppm $SO_3$ |
|---|---|---|---|
| 1 (0.1) | 194 | 204 | 201 |
| 10 (1) | 233 | 242 | 240 |
| 30 (3) | 250 | 259 | 257 |

The sour compression reaction temperature is typically no more than 300° C. and is usually from about 5° C. to about 275° C. Preferred ranges for the reaction temperature may be from about 10° C. to about 150° C., or from about 15° C. to about 100° C.

The temperature of the feed gas after compression may range from about 5° C. to about 500° C. depending on the extent of intercooling and post-compression cooling. If the gas is compressed in multiple stages, then the extent to which the gas is intercooled may be calculated and carefully controlled so as to provide the feed gas not only at the elevated pressure but also at the desired reaction temperature so that any additional post-compression heating or cooling of the gas is minimized or even eliminated entirely. Alternatively, the temperature of the feed gas may be adjusted as required after compression. For example, the gas may be cooled to the desired reaction temperature by indirect heat exchange with a coolant, e.g. cooling water.

It is understood that the formation of sulfuric acid condensate via the sour compression reactions is thermodynamically more favorable than the formation of nitric acid condensate. Thus, it may be possible to produce sulfuric acid condensate separately from nitric acid condensate. Such embodiments are embraced by the present invention. However, a mixture of sulfuric acid and nitric acid condensates is typically produced at the or each pressure stage within the sour gas reactor system.

Regarding the acid/sorbent reaction(s), some or preferably at least substantially all of the sulfuric acid condensate is neutralized by reaction with the alkaline sorbent in the acid/sorbent reactor system to produce sorbent-derived sulfate. Typically, some or preferably at least substantially all of the nitric acid condensate also neutralized by reaction with the alkaline sorbent in the acid/sorbent reactor system to produce sorbent-derived nitrate. For example, neutralization of nitric acid condensate occurs in embodiments in which mixed acid condensate(s) is fed to the acid/sorbent reactor system.

Where the alkaline sorbent is soluble in water, the alkaline sorbent may be used in the form of an aqueous solution. Soluble alkaline sorbents include Group I metal hydroxides, e.g. sodium hydroxide (caustic soda).

Alternatively, the alkaline sorbent may be used in the form of a solid. In these embodiments, the alkaline sorbent may be in a dry state entrained within a motive gas, e.g. air, nitrogen, carbon dioxide, or recycled flue gas. However, if the alkaline sorbent is essentially insoluble in water, then it is typically used in the form of a wet slurry with water.

Suitable alkaline sorbents may be selected from the group consisting of Group II metal carbonates such as calcium carbonate (limestone), magnesium carbonate, and calcium magnesium carbonate (dolomite); Group II metal hydroxides such as calcium hydroxide (slaked or hydrated lime) and magnesium hydroxide; Group II metal oxides such as calcium oxide (quicklime) or magnesium oxide (magnesia); fly ash; and blast furnace slag. Combinations of sorbents may be used.

In preferred embodiments, the solid sorbent is limestone in the form of a wet slurry with water. In these embodiments, sulfuric acid reacts with the sorbent to produce calcium sulfate in accordance with the following formula:

$$CaCO_3 + H_2SO_4 \rightarrow CaSO_4 + CO_2 + H_2O \quad (f)$$

The acid/sorbent reactor may operate at about atmospheric pressure, or at an elevated pressure such as the elevated pressures indicated above for the sour gas reactor system. In some preferred embodiments, the acid/sorbent reactor operates at an elevated pressure from about 10 bar (1 MPa) to about 20 bar (2 MPa), e.g. at about the first elevated pressure of the sour gas reactor system.

The acid/sorbent reactor system may operate at a temperature from about 5° C. to about 150° C. In preferred embodiments, the acid/sorbent reactor system operates at about ambient temperature to about 100° C., e.g. from about 30° C. to about 70° C.

The rate of reaction of sulfuric acid condensate (and nitric acid condensate) with the alkaline sorbent is usually fast. Thus, a period of time sufficient to neutralize sulfuric acid condensate by reaction with the sorbent is typically from about 1 s to about 100 s, e.g. from about 1 s to about 25 s, or from about 1 s to about 10 s. Thus, the residence time in the acid/sorbent reactor system is at least this period of time.

Some of the $SO_2$ in the feed gas may be removed prior to treatment of the gas in the sour gas reactor system. In such embodiments, the feed gas may be pre-treated by maintaining the feed gas in contact with the alkaline sorbent in a desulfurization unit in the presence of $O_2$ for a period of time at least sufficient to react the alkaline sorbent with $SO_2$ to produce the $SO_2$-lean carbon dioxide gas and a mixture of sorbent-derived sulfate and sorbent-derived sulfite. The sour gas reactor system then removes the residual $SO_2$ (and $NO_x$) from the $SO_2$-lean carbon dioxide gas. In these embodiments, the acid/sorbent reactor system is the desulfurization unit and the sulfuric acid condensate is fed to the desulfurization unit for neutralization.

In embodiments where the feed gas is, or is derived from, flue gas from an oxyfuel combustion process, a portion of the $SO_2$ in the flue gas may be removed in a conventional FGD unit upstream of the sour gas reactor system and the feed to the sour gas reactor system is $SO_2$-lean carbon dioxide gas from the FGD unit. The method may, therefore, be used in an existing power generation plant with a conventional FGD unit. For example, the method could be retro-fitted to an existing air-fired combustion unit that has been converted to oxyfuel combustion.

The Inventors believe that, provided the alkaline sorbent contains cations, e.g. calcium ($Ca^{2+}$), magnesium ($Mg^{2+}$) or sodium ($Na^+$), capable of forming stable compounds with sulfite ($SO_3^{2-}$) and sulfate ($SO_4^{2-}$) anions, then a mixture of sorbent derived sulfite and sulfate compounds will usually be formed in the desulfurization unit.

Where limestone is used as the alkaline sorbent, the $SO_2$/sorbent reaction may be expressed as follows:

$$2CaCO_3 + 2SO_2 + \tfrac{1}{2}O_2 \rightarrow CaSO_3 + CaSO_4 + 2CO_2 \quad (g)$$

Where slaked lime is used as the alkaline sorbent, the $SO_2$/sorbent reaction may be expressed as follows:

$$2Ca(OH)_2 + 2SO_2 + \tfrac{1}{2}O_2 \rightarrow CaSO_3 + CaSO_4 + 2H_2O \quad (h)$$

Where magnesium hydroxide is used as the alkaline sorbent, the $SO_2$/sorbent reaction may be expressed as follows:

$$2Mg(OH)_2 + 2SO_2 + \tfrac{1}{2}O_2 \rightarrow MgSO_3 + MgSO_4 + 2H_2O \quad (i)$$

The amount of $SO_2$ contaminant that may be removed in this pre-treatment step depends on a number of factors including the capacity of the alkaline sorbent and the reaction conditions but is usually from about 50% to about 90% of the total $SO_2$ content of the feed gas.

In some embodiments, the acid/sorbent reactor system is downstream of the carbon dioxide feed gas to the sour gas reactor system. Such embodiments may not have an upstream FGD unit providing the feed to the sour gas reactor system but, in such embodiments, the acid/sorbent reactor is in addition to a conventional FGD unit provided upstream of the sour gas reactor system.

The Inventors have realized that the sulfuric acid condensate produced in the sour gas reactor system may be used to help produce the more commercially valuable sorbent-derived sulfate by reaction with sorbent-derived sulfite. For example, where limestone is used as the sorbent and a mixture of calcium sulfite and calcium sulfate is produced in the pre-treatment step, the sulfuric acid condensate promotes oxidation of the sulfite to the sulfate as follows:

$$2CaSO_3 + H_2SO_4 \rightarrow Ca(HSO_3)_2 + CaSO_4 \quad (j)$$

$$Ca(HSO_3)_2 + \tfrac{1}{2}O_2 \rightarrow CaSO_4 + SO_2 + H_2O \quad (k)$$

Thus, the sulfate:sulfite ratio of the mixture produced in such embodiments may be from more than 1:1 to about 10,000:1, e.g. more than 1:1 to greater than 100:1, or about 1.5:1 to about 100:1, or about 2:1 to about 100:1.

Where the method is integrated with an oxyfuel combustion process using coal as fuel, mercury will typically be present in the carbon dioxide gas as a further contaminant (based on typical coal compositions). Injected sorbent is usually effective in removing impurities such as elemental mercury (and trace metals and halides). However, a further advantage of these embodiments of the present invention is that removal of any elemental mercury or mercury compounds present as further contaminant(s) in the carbon dioxide gas will be enhanced, since elemental mercury in the vapor phase will be converted to mercuric nitrate and mercury compounds react readily with nitric acid condensate. Typical nitric acid concentrations in these embodiments of the process will be sufficient to remove all of the mercury from the carbon dioxide gas, either by reaction or dissolution.

In preferred embodiments, the sour gas reactor system comprises at least one stage operating at elevated pressure and the acid/sorbent reactor system operates at a lower pressure than the elevated pressure. Since the acid condensate(s) is produced at the elevated pressure, the acid condensate(s) must be depressurized prior to reaction with the alkaline sorbent. Carbon dioxide is absorbed within the acid condensate(s) at the elevated pressure so depressurizing the acid condensate(s) results in carbon dioxide gas being desorbed from the acid condensate(s), producing desorbed carbon dioxide gas.

In such embodiments, the method comprises depressurizing the sulfuric acid condensate produced at the stage of the sour gas reactor system at the elevated pressure to produce reduced pressure sulfuric acid condensate and desorbed carbon dioxide gas at the lower pressure. The reduced pressure sulfuric acid condensate is then separated from the desorbed carbon dioxide gas, and is then fed to the acid/sorbent reactor system.

Depressurization of the acid condensate(s) may be achieved by flashing the acid condensate(s) across an expansion valve. In other embodiments, the acid condensate(s) may be expanded in an expansion turbine that generates power which may be used to drive equipment within the apparatus, such as auxiliary pumps, e.g. pumps for recycling acid condensate in a countercurrent gas/liquid contact column.

Conventional gas/liquid separation systems such as phase separator vessels may be used to effect this separation and other reduced pressure condensate/desorbed carbon dioxide gas separations.

The Inventors propose that the desorbed carbon dioxide gas be recovered and fed back to the sour gas reactor system to increase overall carbon dioxide recovery. Thus, where the sour gas reactor system has a stage operating at the lower pressure, the desorbed carbon dioxide gas may be recycled to a suitable point within that stage of the sour gas reactor system. Alternatively, the method may comprises compressing at least a portion the desorbed carbon dioxide gas to produce compressed desorbed carbon dioxide gas at the elevated pressure; and recycling the compressed desorbed carbon dioxide gas to a suitable point within the relevant stage of the sour gas reactor system.

In such embodiments, the lower pressure may about atmospheric pressure, or may be from about 10 bar (1 MPa) to about 20 bar (2 MPa), e.g. the first elevated pressure of a sour gas reactor system having more than one stage operating at different elevated pressures.

The sour gas reactor system may comprises a first stage operating at a first elevated pressure and a second stage operating at a second elevated pressure that is higher than the first elevated pressure. The acid condensate(s) may be depressurized to the next lower pressure level and the resulting flash gas may be recovered and recycled to the sour gas reactor system at that pressure level in order to avoid expending any unnecessary compression power to recompress all of the flash gas to the higher pressure.

In such embodiments, the acid/sorbent reactor may operate at the first elevated pressure. The method may, therefore, comprise feeding the sulfuric acid condensate produced in the first stage of the sour gas reactor system to the acid/sorbent reactor system. The method may further comprise depressurizing the sulfuric acid condensate produced at the second stage to produce reduced pressure sulfuric acid condensate and desorbed carbon dioxide gas at the first elevated pressure; separating the reduced pressure sulfuric acid condensate from the desorbed carbon dioxide gas; and feeding the reduced pressure sulfuric acid condensate to said acid/sorbent reactor system.

In these embodiments, the desorbed carbon dioxide may be recycled to the first stage of the sour gas reactor system. Alternatively, at least a portion of the desorbed carbon dioxide gas may be compressed to produce compressed desorbed carbon dioxide gas at the second elevated pressure; and the compressed desorbed carbon dioxide gas may be recycled to the second stage of the sour gas reactor system.

In such embodiments, the first elevated pressure may be from about 10 bar (1 MPa) to about 20 bar (2 MPa).

The sour gas reactor system may comprise a first stage operating at a first elevated pressure and a second stage operating at a second elevated pressure that is higher than the first elevated pressure, and the acid/sorbent reactor may operate at about atmospheric pressure. The method may then comprise depressurizing the sulfuric acid condensate produced at the first stage to produce first reduced pressure sulfuric acid condensate and first desorbed carbon dioxide gas at about atmospheric pressure; separating the first reduced pressure sulfuric acid condensate from the first desorbed carbon dioxide gas; and feeding the first reduced pressure sulfuric acid condensate to the acid/sorbent reactor system.

In such embodiments, the method may comprise compressing the first desorbed carbon dioxide gas to produce compressed first desorbed carbon dioxide gas at the first elevated pressure; and recycling the compressed first desorbed carbon dioxide gas to a suitable point within the first stage of the sour gas reactor system.

The method may also comprising depressurizing the sulfuric acid condensate produced at the second stage to produce second reduced pressure sulfuric acid condensate and second desorbed carbon dioxide gas at the first elevated pressure; and separating the second reduced pressure sulfuric acid condensate from the second desorbed carbon dioxide gas. In such embodiments, the second reduced pressure sulfuric acid condensate is usually combined with the sulfuric acid condensate produced at the first stage prior to depressurization to form the first reduced pressure sulfuric acid condensate.

The second desorbed carbon dioxide gas may be recycled to a suitable point within the first stage of the sour gas reactor system. Alternatively, at least a portion of the second desorbed carbon dioxide gas may be compressed to produce compressed second desorbed carbon dioxide gas at the second elevated pressure; and the compressed second desorbed carbon dioxide gas may be recycled to a suitable point within the second stage of the sour gas reactor system.

Countercurrent gas/liquid contact devices such as columns or scrub towers allow intimate mixing of water with $SO_3$ and $NO_2$ to remove continuously these components from the gas thereby allowing reactions to proceed until at least substantially all $SO_2$ is removed, together with the bulk of the $NO_x$. Such devices are suitable for providing the required contact time for the conversion(s).

The carbon dioxide gas feed to the sour reactor gas system may be washed with water in at least one countercurrent gas/liquid contact device, e.g. column or scrub tower, to produce the $SO_2$-depleted, $NO_x$-lean carbon dioxide and mixed acid condensate(s). The acid condensates are usually dilute. A portion of the mixed acid condensate produced at a particular stage of the sour gas reactor system is preferably pumped, cooled and recycled to the top of the gas/liquid contact column to provide the descending water to wash the gas.

The sour gas reactor system typically comprises at least two countercurrent gas/liquid contact columns, a first column operating at the first elevated pressure and a second column operating at the second elevated pressure. In such embodiments, the method comprises washing the carbon dioxide feed gas, or the $SO_2$-lean carbon dioxide gas derived therefrom, with water at the first elevated pressure in a first countercurrent gas/liquid contact column to produce an intermediate $SO_2$-depleted carbon dioxide gas and a first acid condensate mixture of sulfuric acid condensate and nitric acid condensate; separating the intermediate $SO_2$-depleted carbon dioxide gas from the first acid condensate mixture; depressurizing the first acid condensate mixture to produce reduced pressure first acid condensate mixture and a first desorbed carbon dioxide gas at about atmospheric pressure; separating the reduced pressure first acid condensate mixture from the first desorbed carbon dioxide gas; feeding the reduced pressure first acid condensate mixture to the acid/sorbent reactor system; recycling the first desorbed carbon dioxide gas to a point within the sour gas reactor system at about atmospheric pressure; compressing the intermediate $SO_2$-depleted carbon dioxide gas to the second elevated pressure; washing the intermediate $SO_2$-depleted carbon dioxide gas with water at the second elevated pressure in a second countercurrent gas/liquid contact column to produce the $SO_2$-depleted, $NO_x$-lean carbon dioxide gas and a second acid condensate mixture of sulfuric acid condensate and nitric acid condensate; and separating the $SO_2$-depleted, $NO_x$-lean carbon dioxide gas from the second acid condensate mixture.

A portion of the first acid condensate mixtures is usually pumped, cooled and recycled to the top of the first gas/liquid contact device. A portion of the second acid condensate mixture is usually pumped cooled and recycled to the second gas/liquid contact device.

The method may also comprise depressurizing the second acid condensate mixture to produce reduced pressure second acid condensate mixture and a second desorbed carbon dioxide gas at the first elevated pressure; separating the reduced pressure second acid condensate mixture from the second desorbed carbon dioxide gas; recycling the second desorbed carbon dioxide gas to a point within the sour gas reactor system at the first elevated pressure; and combining the reduced pressure second acid condensate mixture with the reduced pressure first acid condensate mixture at said first elevated pressure.

In alternative embodiments, the method may comprise washing the carbon dioxide feed gas, or the $SO_2$-lean carbon dioxide gas derived therefrom, with water at the first elevated pressure in a first countercurrent gas/liquid contact device to produce intermediate $SO_2$-depleted carbon dioxide gas and a first acid condensate mixture of sulfuric acid condensate and nitric acid condensate; separating the intermediate $SO_2$-depleted carbon dioxide gas from the first acid condensate mixture; feeding the first acid condensate mixture at the first elevated pressure to the acid/sorbent reactor system operating at said first elevated pressure; compressing the intermediate $SO_2$-depleted carbon dioxide gas to the second elevated pressure; washing the intermediate $SO_2$-depleted carbon dioxide gas with water at the second elevated pressure in a second countercurrent gas/liquid contact device to produce the $SO_2$-depleted, $NO_x$-lean carbon dioxide gas and a second acid condensate mixture of sulfuric acid condensate and nitric acid condensate; and separating the $SO_2$-depleted, $NO_x$-lean carbon dioxide gas from the second acid condensate mixture.

In such alternative embodiments, the method may comprise depressurizing the second acid condensate mixture to produce reduced pressure second acid condensate mixture and desorbed carbon dioxide gas at the first elevated pressure; feeding reduced pressure second acid condensate mixture and the desorbed carbon dioxide gas at the first elevated pressure to said acid/sorbent reactor system operating at said first elevated pressure; and recovering the desorbed carbon dioxide gas from the acid/sorbent reactor system and recycling the desorbed carbon dioxide gas to a point within the sour gas reactor system at the first elevated pressure.

In preferred embodiments, the levels of $SO_2$ and NO in the $SO_2$-depleted, $NO_x$-lean carbon dioxide gas are below the maximum allowable limits and, thus, further processing of the gas to remove residual $SO_2$ and/or $NO_x$ is not required. However, if necessary, residual $NO_x$ may be removed by reduction to $N_2$ in a Selective Catalytic Reaction (SCR) with ammonia, and residual $SO_2$ may be removed by oxidizing $SO_2$ catalytically to produce $SO_3$ which then reacts with water to produce sulfuric acid which is then condensed out of the gas. A suitable process is disclosed in U.S. Pat. No. 4,781,902 A, the disclosure of which is incorporated herein by reference.

At least a portion of the $SO_x$-depleted, $NO_x$-lean carbon dioxide gas produced by the present invention may be further processed to purify the carbon dioxide. For example, the method of the present invention may be integrated with a carbon dioxide recovery and purification system operating at an elevated pressure. The elevated pressures of the present invention and the downstream system would usually be selected such that the $SO_2$-depleted $NO_x$-lean carbon dioxide gas, or a $SO_2$-depleted $NO_x$-lean carbon dioxide gas derived therefrom, can be fed to the downstream system without any pressure adjustment (subject to any inherent pressure drop in the apparatus).

In preferred embodiments in which the gas comprises water vapor and "non-condensable" gases such as $N_2$, $O_2$ and Ar, the $SO_x$-depleted, $NO_x$-lean carbon dioxide gas is usually dried, purified to remove the "non-condensable" components, and compressed to a pipeline pressure from about 80 bar (8 MPa) to about 250 bar (25 MPa). The gas may then be stored in geological formations or in deep sea locations, or may be used in EOR processes.

The $SO_x$-depleted $NO_x$-lean carbon dioxide gas may be dried in a desiccant drier and then cooled to a temperature close to its triple point where the "non-condensable" components are removed as gases in a vent stream. This process allows the carbon dioixde loss with the vent stream to be minimized by fixing the feed gas pressure at an appropriate level, e.g. from about 20 bar (2 MPa) to about 40 bar (4 MPa).

Suitable "non-condensable" components removal processes for use with the present invention are described in "*Oxyfuel conversion of heaters and boilers for $CO_2$ capture*" (Wilkinson et al., Second National Conference on Carbon Sequestration; May 5-8, 2003; Washington D.C.); US 2008/0173584 A1; US 2008/0173585 A1; and US 2008/0176174 A1, the disclosure of each of which is incorporated herein by reference. If the present method is used to remove $SO_2$ and $NO_x$ from flue gas produced in an oxyfuel combustion process and is integrated with one of these "non-condensable" components removal methods, then the integrated process typically leads to $CO_2$ purities of 95% to 99.99%, and to $CO_2$ recoveries of 90% to 99%.

Apparatus suitable for working the method according to the first aspect of the present invention, comprises a sour gas reactor system for maintaining the carbon dioxide feed gas, or a $SO_2$-lean carbon dioxide gas derived therefrom, at elevated pressure(s) in the presence of $O_2$, water and NO for a period of time sufficient to convert $SO_2$ to sulfuric acid condensate and NO to nitric acid condensate; a first separation system for separating the acid condensates from the carbon dioxide gas to produce $SO_2$-depleted, $NO_x$-lean carbon dioxide gas; an acid/sorbent reactor system for neutralizing at least a portion of the sulfuric acid condensate by reaction with an alkaline sorbent to produce sorbent-derived sulfate; and a conduit arrangement for feeding the sulfuric acid condensate from the first separation system to said acid/sorbent reactor system.

In some preferred embodiments, the acid/sorbent reaction is a dedicated acid/sorbent reactor system. These embodiments have the advantage of eliminating a FGD unit if not required for the reasons of corrosion in the oxyfuel combustion unit, or for emissions.

The acid/sorbent reactor system may be a desulfurization unit for pre-treating the feed gas by maintaining the feed gas in contact with an alkaline sorbent in the presence of $O_2$ for a period of time at least sufficient to react the alkaline sorbent with $SO_2$ to produce said $SO_2$-lean carbon dioxide gas. In such embodiments, the apparatus comprises a conduit arrangement for feeding the $SO_2$-lean carbon dioxide gas from the desulfurization unit to the sour gas reactor system.

The sour gas reactor system may comprise at least one stage for operating at elevated pressure and the acid/sorbent reactor system is operable at a lower pressure than the elevated pressure. In such embodiments, the apparatus comprises a depressurization system for depressurizing sulfuric acid condensate produced at the stage to produce reduced pressure sulfuric acid condensate and desorbed carbon dioxide gas at the lower pressure; a conduit arrangement for feeding the sulfuric acid condensate from the first separation system to the depressurization system; a second separation system for separating the reduced pressure sulfuric acid condensate from the desorbed carbon dioxide gas; a conduit arrangement for feeding the reduced pressure sulfuric acid condensate and desorbed carbon dioxide gas from the depressurization system to the second separation system; and a conduit arrangement for feeding the reduced pressure sulfuric acid condensate from the second separation system to the acid/sorbent reactor system.

The or each depressurization system usually comprises at least one depressurization device selected from the group consisting of an expansion valve; and an expansion turbine. In some embodiments, the depressurization system involves the use of more than one such device such as a combination of expansion valve(s) and expansion turbine(s).

Such apparatus may comprises a compression system for compressing the desorbed carbon dioxide gas to produce compressed desorbed carbon dioxide gas at the elevated pressure; a conduit arrangement for feeding the desorbed carbon dioxide gas from the second separation system to the compression system; and a conduit arrangement for feeding the compressed desorbed carbon dioxide gas from the compression system to the stage of said sour gas reactor system.

The sour gas reactor system and the first separation system may be within the same vessel. Alternatively, the sour gas reactor system and the first separation system are in separate vessels in which case the apparatus comprises a conduit arrangement for feeding $SO_2$-depleted, $NO_x$-lean carbon dioxide gas and said sulfuric and nitric acids from the sour gas reactor system to the first separation system.

In embodiments where the $SO_2$/sorbent reaction takes place at a pressure, e.g. atmospheric pressure, that is less than the elevated pressure, the apparatus may comprise a depressurization system for depressurizing said acid condensate to produce reduced pressure acid condensate and desorbed carbon dioxide gas; a conduit arrangement for feeding the acid condensate from the first separation system to the depressurization system; a second separation system for separating the reduced pressure acid condensate from the desorbed carbon dioxide gas; a conduit arrangement for feeding the reduced pressure acid condensate and desorbed carbon dioxide gas from the depressurization system to the second separation system; a conduit arrangement for recycling the desorbed carbon dioxide gas from the second separation system to the sour compression reactor system; and a conduit arrangement for feeding the reduced pressure acid condensate from the second separation system to the acid/sorbent reactor system.

In some embodiments, the sour gas reactor system comprises at least two countercurrent gas/liquid contact devices in series. In these embodiments, the apparatus comprises a first countercurrent gas/liquid contact device for washing the carbon dioxide feed gas, or the $SO_2$-lean carbon dioxide gas derived therefrom, with water at a first elevated pressure to produce intermediate $SO_2$-depleted carbon dioxide gas and a first acid condensate mixture of sulfuric acid condensate and nitric acid condensate; a first separator for separating the intermediate $SO_2$-depleted carbon dioxide gas from the first acid condensate mixture at the first elevated pressure; a conduit arrangement for feeding intermediate $SO_2$-depleted carbon dioxide gas and first acid condensate mixture from the first countercurrent gas/liquid contact device to the first separator; a first depressurization device for depressurizing the first acid condensate mixture to produce reduced pressure first acid condensate mixture and a first desorbed carbon dioxide gas at about atmospheric pressure; a conduit arrangement for feeding first acid condensate mixture from the first separator to the first depressurization device; a second separator for separating the reduced pressure first acid condensate mixture from the first desorbed carbon dioxide gas; a conduit arrangement for feeding reduced pressure first acid condensate mixture and first desorbed carbon dioxide gas from the first depressurization device to the second separator; a conduit arrangement for feeding the reduced pressure first acid condensate mixture from the second separator to the acid/sorbent reactor system; a conduit arrangement for recycling the first desorbed carbon dioxide gas at about atmospheric pressure from the second separator to the sour gas reactor system; a compression system for compressing the intermediate $SO_2$-depleted carbon dioxide gas to a second elevated pressure; a conduit arrangement for feeding the intermediate $SO_2$-depleted carbon dioxide gas from the first separator to the compression system; a second countercurrent gas/liquid contact device for washing the intermediate $SO_2$-depleted carbon dioxide gas with water at the second elevated pressure to produce the $SO_2$-depleted, $NO_x$-lean carbon dioxide gas and a second acid condensate mixture of sulfuric acid condensate and nitric acid condensate; a conduit arrangement for feeding the intermediate $SO_2$-depleted carbon dioxide gas from the compression system to the second countercurrent gas/liquid contact device; a third separator for separating the $SO_2$-depleted, $NO_x$-lean carbon dioxide gas from the second acid condensate mixture; and a conduit arrangement for feeding the $SO_2$-depleted, $NO_x$-lean carbon dioxide gas and second acid condensate mixture from the second countercurrent gas/liquid contact device to the third separator.

Such embodiments may further comprise a second depressurization device for depressurizing the second acid condensate mixture to produce reduced pressure second acid condensate mixture and a second desorbed carbon dioxide gas at the first elevated pressure; a conduit arrangement for feeding reduced pressure second acid condensate mixture from the third separator to the second depressurization device; a fourth separator for separating reduced pressure second acid condensate mixture from the second desorbed carbon dioxide gas; a conduit arrangement for feeding the reduced pressure second acid condensate mixture and second desorbed carbon dioxide gas from the second depressurization device to the fourth separator; a conduit arrangement for recycling the second desorbed carbon dioxide gas at said first elevated pressure to said sour gas reactor system; and a conduit arrangement for combining the reduced pressure second acid condensate mixture with the first acid condensate mixture at said first elevated pressure.

The acid/sorbent reactor system may comprise at least one low pressure gas/liquid/solid contacting device or, preferably, a solid/liquid contacting device such as a continuously stirred tank reactor ("CSTR"). The system may comprise a series of such devices operating at different pressures.

In alternative embodiments in which the sour gas reactor system may comprise at least two countercurrent gas/liquid contact devices in series, the apparatus may comprise a first countercurrent gas/liquid contact device for washing the carbon dioxide feed gas, or said $SO_2$-lean carbon dioxide gas derived therefrom, with water at a first elevated pressure to produce intermediate $SO_2$-depleted carbon dioxide gas and a first acid condensate mixture of sulfuric acid condensate and nitric acid condensate; a first separator for separating the intermediate $SO_2$-depleted carbon dioxide gas from the first acid condensate mixture at the first elevated pressure; a conduit arrangement for feeding intermediate $SO_2$-depleted carbon dioxide gas and first acid condensate mixture from the first countercurrent gas/liquid contact device to the first separator; a conduit arrangement for feeding the first acid condensate mixture at the first elevated pressure from the first separator to the acid/sorbent reactor system; a compression system for compressing the intermediate $SO_2$-depleted carbon dioxide gas to a second elevated pressure; a conduit arrangement for feeding the intermediate $SO_2$-depleted carbon dioxide gas from the first separator to the compression system; a second countercurrent gas/liquid contact device for washing the intermediate $SO_2$-depleted carbon dioxide gas with water at the second elevated pressure to produce the $SO_2$-depleted, $NO_x$-lean carbon dioxide gas and a second acid condensate mixture of sulfuric acid condensate and nitric acid condensate; a conduit arrangement for feeding the intermediate $SO_2$-depleted carbon dioxide gas from the compression system to the second countercurrent gas/liquid contact device; a third separator for separating the $SO_2$-depleted, $NO_x$-lean carbon dioxide gas from the second acid condensate mixture; and a conduit arrangement for feeding the $SO_2$-depleted, $NO_x$-lean carbon dioxide gas and second acid condensate mixture from the second countercurrent gas/liquid contact device to the third separator.

In such embodiments, the apparatus may further comprise a depressurization device for depressurizing the second acid condensate mixture to produce reduced pressure second acid condensate mixture and desorbed carbon dioxide gas at the first elevated pressure; a conduit arrangement for feeding second acid condensate mixture from the third separator to the depressurization device; a conduit arrangement for feeding reduced pressure second acid condensate mixture and desorbed carbon dioxide gas at the first elevated pressure to the acid/sorbent reactor system; and a conduit arrangement for recycling the desorbed carbon dioxide gas recovered from the acid/sorbent reactor system at the first elevated pressure to the sour gas reactor system.

Aspects of the invention include:

1. A method for removing $SO_2$ from carbon dioxide feed gas comprising $SO_2$ as a contaminant, said method comprising:
  maintaining said carbon dioxide feed gas, or a $SO_2$-lean carbon dioxide gas derived therefrom, at elevated pressure(s) in a sour gas reactor system in the presence of $O_2$, water and NO for a period of time sufficient to convert $SO_2$ to sulfuric acid condensate and $NO_x$ to nitric acid condensate;
  separating said acid condensates from said carbon dioxide gas to produce $SO_2$-depleted, $NO_x$-lean carbon dioxide gas; and
  neutralizing at least a portion of said sulfuric acid condensate by reaction with an alkaline sorbent in an acid/sorbent reactor system to produce sorbent-derived sulfate.

2. A method according to #1, wherein at least a portion of said nitric acid condensate is neutralized by reaction with said alkaline sorbent in said acid/sorbent reactor system to produce sorbent-derived nitrate.

3. A method according to #1 or #2, said method comprising pre-treating said feed gas by maintaining said feed gas in contact with an alkaline sorbent in a desulfurization unit in the presence of $O_2$ for a period of time at least sufficient to react said alkaline sorbent with $SO_2$ to produce said $SO_2$-lean carbon dioxide gas and a mixture of sorbent-derived sulfate and sorbent-derived sulfite, wherein said acid/sorbent reactor system is said desulfurization unit and said sulfuric acid condensate is fed to said desulfurization unit for neutralization.

4. A method according to #1 or #2, wherein acid/sorbent reactor system is downstream of said carbon dioxide feed gas to the sour gas reactor system.

5. A method according to any of #1 to #4, wherein said sour gas reactor system comprises at least one stage operating at elevated pressure and said acid/sorbent reactor system operates at a lower pressure than said elevated pressure, said method comprising:
  depressurizing said sulfuric acid condensate produced at said stage to produce reduced pressure sulfuric acid condensate and desorbed carbon dioxide gas at said lower pressure;
  separating said reduced pressure sulfuric acid condensate from said desorbed carbon dioxide gas; and
  feeding said reduced pressure sulfuric acid condensate to said acid/sorbent reactor system.

6. A method according to #5, said method comprising:
  compressing said desorbed carbon dioxide gas to produce compressed desorbed carbon dioxide gas at said elevated pressure; and
  recycling said compressed desorbed carbon dioxide gas to said stage of said sour gas reactor system.

7. A method according to #4 or #5, wherein said lower pressure is about atmospheric pressure.

8. A method according to #4 or #5, wherein said lower pressure is from about 10 bar (1 MPa) to about 20 bar (2 MPa).

9. A method according to any of #1 to #8, wherein said sour gas reactor system comprises a first stage operating at a first elevated pressure and a second stage operating at a second elevated pressure that is higher than the first elevated pressure, and said acid/sorbent reactor operates at said first elevated pressure.

10. A method according to #9, said method comprising feeding said sulfuric acid condensate produced in said first stage of said sour gas reactor system to said acid/sorbent reactor system.

11. A method according to #9 or #10, said method comprising:
  depressurizing said sulfuric acid condensate produced at said second stage to produce reduced pressure sulfuric acid condensate and desorbed carbon dioxide gas at said first elevated pressure;
  separating said reduced pressure sulfuric acid condensate from said desorbed carbon dioxide gas; and
  feeding said reduced pressure sulfuric acid condensate to said acid/sorbent reactor system.

12. A method according to #11, said method comprising recycling said desorbed carbon dioxide to said first stage of said sour gas reactor system.

13. A method according to #11 or #12, said method comprising:
  compressing said desorbed carbon dioxide gas to produce compressed desorbed carbon dioxide gas at said second elevated pressure; and
  recycling said compressed desorbed carbon dioxide gas to said second stage of said sour gas reactor system.

14. A method according to any of #9 to #13, wherein said first elevated pressure is from about 10 bar (1 MPa) to about 20 bar (2 MPa).

15. A method according to #1 to #8, wherein said sour gas reactor system comprises a first stage operating at a first elevated pressure and a second stage operating at a second elevated pressure that is higher than the first elevated pressure, and said acid/sorbent reactor operates at about atmospheric pressure.

16. A method according to #15, said method comprising:
  depressurizing said sulfuric acid condensate produced at said first stage to produce first reduced pressure sulfuric acid condensate and first desorbed carbon dioxide gas at about atmospheric pressure;
  separating said first reduced pressure sulfuric acid condensate from said first desorbed carbon dioxide gas; and
  feeding said first reduced pressure sulfuric acid condensate to said acid/sorbent reactor system.

17. A method according to #16, said method comprising:
  compressing said first desorbed carbon dioxide gas to produce compressed first desorbed carbon dioxide gas at said first elevated pressure; and
  recycling said compressed first desorbed carbon dioxide gas to said first stage of said sour gas reactor system.

18. A method according to any of #15 to #17, said method comprising:
  depressurizing said sulfuric acid condensate produced at said second stage to produce second reduced pressure sulfuric acid condensate and second desorbed carbon dioxide gas at said first elevated pressure; and
  separating said second reduced pressure sulfuric acid condensate from said second desorbed carbon dioxide gas;
wherein said second reduced pressure sulfuric acid condensate is combined with said sulfuric acid condensate produced at said first stage prior to depressurization to form said first reduced pressure sulfuric acid condensate.

19. A method according to #18, said method comprising recycling said second desorbed carbon dioxide gas to said first stage of said sour gas reactor system.

20. A method according to #18 or #19, said method comprising:
  compressing said second desorbed carbon dioxide gas to produce compressed second desorbed carbon dioxide gas at said second elevated pressure; and
  recycling said compressed second desorbed carbon dioxide gas to said second stage of said sour gas reactor system.

21. Apparatus for removing $SO_2$ from a carbon dioxide feed gas comprising $SO_2$ as a contaminant, said apparatus comprising:
  a sour gas reactor system for maintaining said carbon dioxide feed gas, or a $SO_2$-lean carbon dioxide gas derived therefrom, at elevated pressure(s) in the presence of $O_2$, water and $NO_x$ for a period of time sufficient to convert $SO_2$ to sulfuric acid condensate and $NO_x$ to nitric acid condensate;
  a first separation system for separating said acid condensates from said carbon dioxide gas to produce $SO_2$-depleted, $NO_x$-lean carbon dioxide gas;
  an acid/sorbent reactor system for neutralizing at least a portion of said sulfuric acid condensate by reaction with an alkaline sorbent to produce sorbent-derived sulfate; and
  a conduit arrangement for feeding said sulfuric acid condensate from said first separation system to said acid/sorbent reactor system.

22. Apparatus according to #21, wherein said acid/sorbent reactor system is a desulfurization unit for pre-treating said feed gas by maintaining said feed gas in contact with an alkaline sorbent in the presence of $O_2$ for a period of time at least sufficient to react said alkaline sorbent with $SO_2$ to produce said $SO_2$-lean carbon dioxide gas, said apparatus comprising a conduit arrangement for feeding said SO₂-lean carbon dioxide gas from said desulfurization unit to said sour gas reactor system.

23. Apparatus according to #21 or #22, wherein said sour gas reactor system comprises at least one stage for operating at elevated pressure and said acid/sorbent reactor system is operable at a lower pressure than said elevated pressure, said apparatus comprising:
  a depressurization system for depressurizing sulfuric acid condensate produced at said stage to produce reduced pressure sulfuric acid condensate and desorbed carbon dioxide gas at said lower pressure;
  a conduit arrangement for feeding said sulfuric acid condensate from said first separation system to said depressurization system;
  a second separation system for separating said reduced pressure sulfuric acid condensate from said desorbed carbon dioxide gas;
  a conduit arrangement for feeding said reduced pressure sulfuric acid condensate and desorbed carbon dioxide gas from said depressurization system to said second separation system; and
  a conduit arrangement for feeding said reduced pressure sulfuric acid condensate from said second separation system to said acid/sorbent reactor system.

24. Apparatus according to #23, said apparatus comprising:
  a compression system for compressing said desorbed carbon dioxide gas to produce compressed desorbed carbon dioxide gas at said elevated pressure;
  a conduit arrangement for feeding said desorbed carbon dioxide gas from said second separation system to said compression system; and
  a conduit arrangement for feeding said compressed desorbed carbon dioxide gas from said compression system to said stage of said sour gas reactor system.

Referring to FIG. 1, a cryogenic air separation unit (ASU) 2 produces a stream 4 of oxygen which is fed to an oxyfuel combustion unit 6 in which a stream 8 of pulverized coal is combusted at about atmospheric pressure. A stream 10 of flue gas is removed from the boiler unit 6 and fed to a flue gas desulfurization (FGD) unit 12. A stream 14 of aqueous limestone slurry is fed to the FGD unit 12. The aqueous limestone slurry reacts with SO₂ and O₂ from the flue gas to form SO₂-lean carbon dioxide gas and a mixture of calcium sulfite and calcium sulfate. The SO₂-lean carbon dioxide gas is separated from the sulfite/sulfate mixture and a stream 16 of SO₂-lean carbon dioxide gas is removed from the FGD unit 12. The FGD unit 12 is usually responsible for removal of 50-90% of the SO₂ in the flue gas in stream 10.

Stream 16 may be divided into two parts. The first part 22, containing about 60-80% of stream 16, is recycled to the boiler unit 6 to control the combustion temperature. The second part 18, containing about 20-40% of stream 16, is fed to a carbon dioxide purification unit (CPU) 20. The second part 18 may be washed with water in a wash tower (not shown) to cool the flue gas and to remove particulates such as ash and soot, and water soluble components such SO₃ and HCl. The second portion 18 is then purified in the CPU 20 to produce a stream 24 of purified carbon dioxide for storage or use in EOR processes, and a vent stream 26 containing the non-condensable components from the flue gas.

In the CPU 20, NO and residual SO₂ are removed from the carbon dioxide gas using a sour gas reactor system (not shown) in which the gas is maintained at elevated pressure in the presence of O₂ and water for a period of time sufficient to convert not only SO₂ to sulfuric acid but also NO$_x$ to nitric acid. The resultant SO₂-depleted, NO$_x$-lean carbon dioxide gas is then dried and purified in a conventional purification process such as a partial condensation, to produce the purified carbon dioxide and vent gas.

A stream 28 of sulfuric acid condensate, usually containing nitric acid condensate, is removed from the CPU 20 and fed to the FGD unit 12 where the sulfuric acid condensate reacts with both the alkaline sorbent and the calcium sulfite to produce calcium sulfate. A stream 30 of calcium sulfate in the form of an aqueous gypsum slurry is removed from the FGD unit 12. This stream will contain calcium nitrate produced by reaction of nitric acid condensate with the alkaline sorbent.

Figure 2:
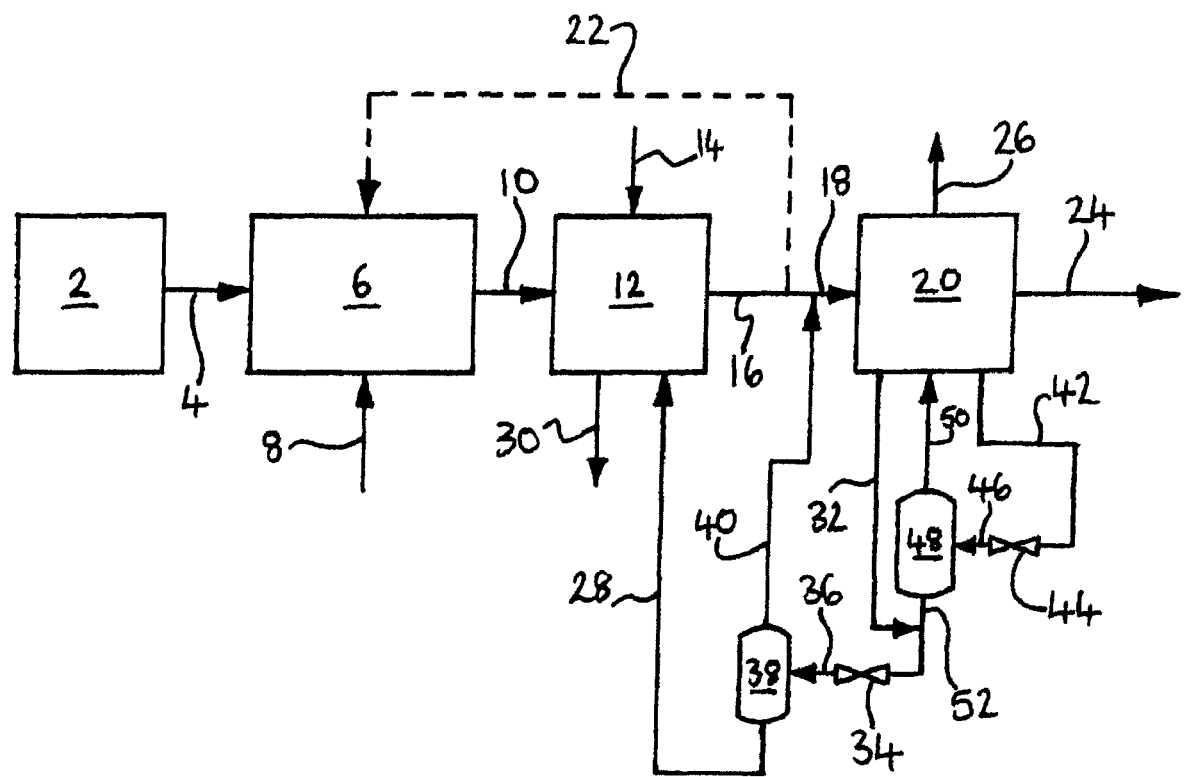
FIG. 2 is a flow sheet depicting one possible arrangement of the embodiment depicted in FIG. 1.

Another embodiment of the invention is depicted in FIG. 2. The features common to FIGS. 1 and 2 have the same reference numerals. The following is a discussion of the different features of the other embodiment.

Referring to FIG. 2, the flue gas is compressed in a first stage to 15 bar (1.5 MPa) and then in a second stage to 30 bar (3 MPa) using a multistage carbon dioxide compression train (not shown). If there is only a small amount of residual SO₂ in the flue gas following scrubbing in FGD unit 12, then simple interstage or post-compression cooling, and vapor/liquid separation may be sufficient to remove the acid condensate at each stage. However, where such an arrangement would not provide sufficient hold up time for the sour compression reactions to occur to a sufficient extent in view of the amount of residual SO₂, additional hold up time may be provided at each stage by washing the gas in a countercurrent gas/liquid contact column to produce SO₂-depleted carbon dioxide gas and acid condensate. Such an arrangement is discussed in more detail in FIG. 4.

A stream 32 of mixed acid condensate at 15 bar (1.5 MPa) is removed from the CPU 20 and flashed across a first expansion valve 34 to produce a stream 36 containing reduced pressure first acid condensate and desorbed carbon dioxide gas at about atmospheric pressure. Stream 36 is fed to a first phase separator 38 and separated into a stream 40 of desorbed carbon dioxide at about atmospheric pressure which is recycled to the feed 18 to the CPU 20, and a stream 28 of mixed acid condensate which is fed to the FGD unit 12.

A stream 42 of mixed acid condensate at 30 bar (3 MPa) is removed from the CPU 20 and flashed across a second expansion valve 44 to produce a stream 46 containing reduced pressure acid condensate and desorbed carbon dioxide gas at 15 bar (1.5 MPa). Stream 46 is fed to a second phase separator 48 and separated into a stream 50 of desorbed carbon dioxide gas at 15 bar (1.5 MPa) which is recycled to a suitable point in the CPU 20 for compression to 30 bar (3 MPa), and a stream 52 of acid condensate at 15 bar (1.5 MPa) which is combined with stream 32 and the combined stream is flashed across the first expansion valve 34.

Figure 3:
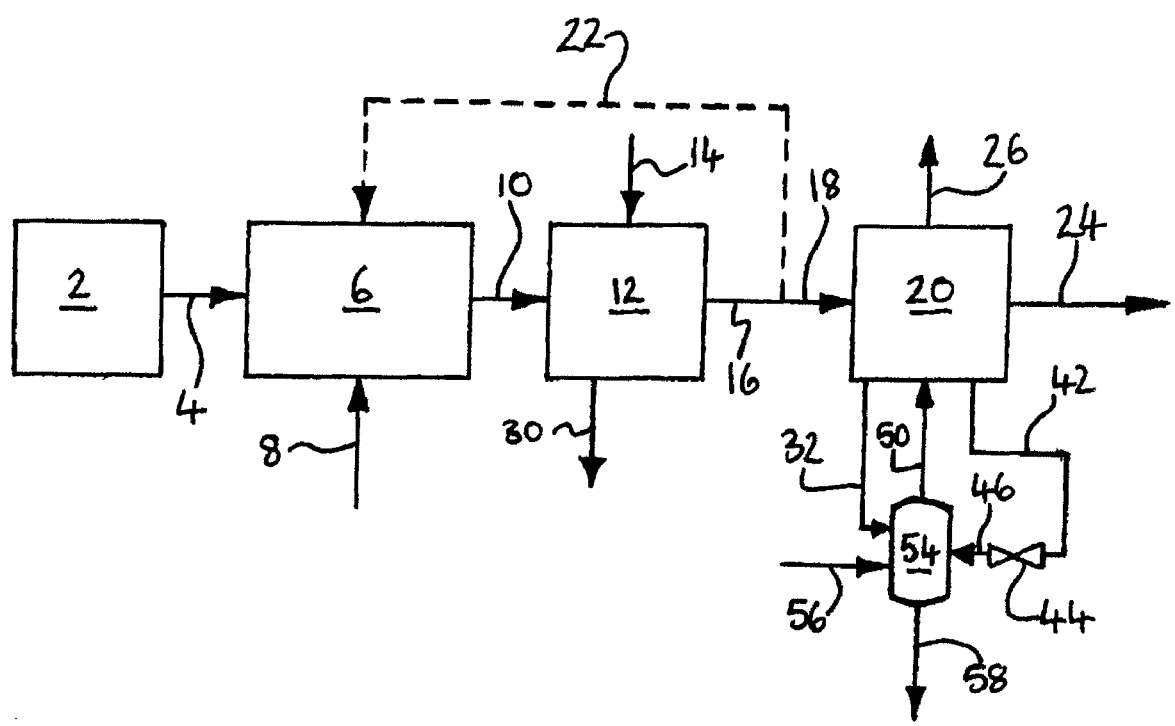
FIG. 3 is a flow sheet depicting a further embodiment of the present invention involving a pressurized $SO_2$/sorbent reactor system.

A further embodiment of the present invention is depicted in FIG. 3. The features common to FIGS. 2 and 3 have the same reference numerals. The following is a discussion of the different features of the further embodiment.

Referring to FIG. 3, the stream 32 of acid condensate at 15 bar (1.5 MPa) is removed from the CPU 20 and fed to a second acid/sorbent reactor 54 where it is reacted with an aqueous limestone slurry fed into the reactor 54 as stream 56. Instead of being fed to a second phase separator, stream 46 of reduced pressure acid condensate and desorbed carbon dioxide gas at 15 bar (1.5 MPa) is fed directly to the second acid/sorbent reactor 54. The stream 50 of desorbed carbon dioxide gas at 15 bar (1.5 MPa) is recovered directly from the second acid/sorbent reactor 54.

The acid condensates react with the limestone in the second acid/sorbent reactor 54 to produce a second stream 58 of gypsum in the form of an aqueous slurry containing calcium nitrate.

Figure 4:
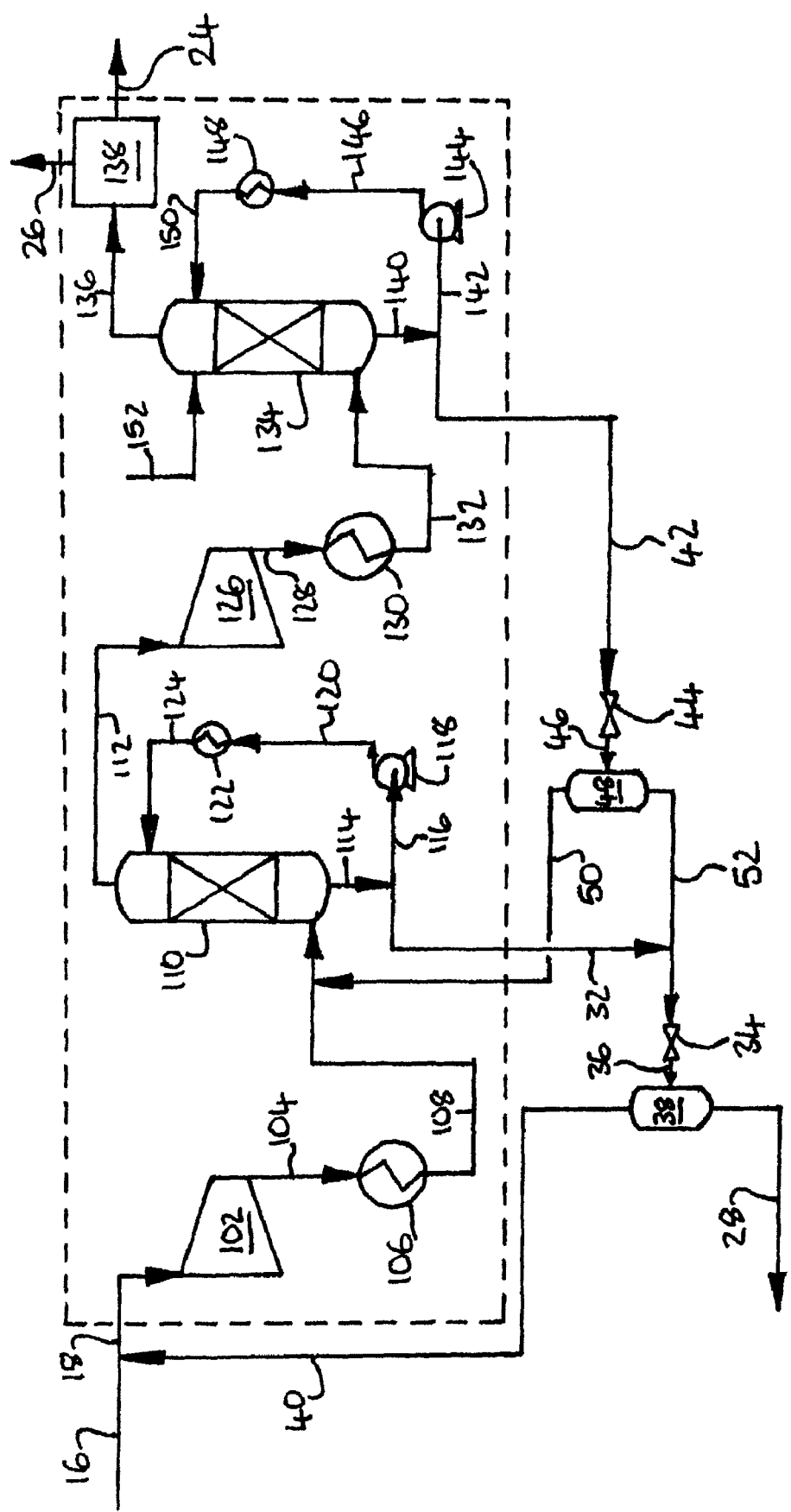
FIG. 4 is a flow sheet depicting in more detail the sour gas reactor system of the carbon dioxide purification unit 20 in FIG. 2.

The CPU 20 in FIG. 2 may comprise a countercurrent gas/liquid contact column operating at each pressure stage. Referring to FIG. 4, stream 18 of washed $SO_2$-lean carbon dioxide gas is compressed to about 15 bar (1.5 MPa) in a compression system 102 which is part of the multistage carbon dioxide gas compression train. A stream 104 of compressed $SO_2$-lean carbon dioxide gas is cooled by indirect heat exchange with a coolant such as cooling water in heat exchanger 106 (which may actually be a series of heat exchangers) to produce a stream 108 of cooled, compressed flue gas which is fed to a first countercurrent gas/liquid contact column 110. The column provides additional hold up time at 15 bar (1.5 MPa) to allow the sour compression reactions to occur. The gas is washed in the column by direct contact with aqueous acid to produce a stream 112 of first $SO_2$-depleted carbon dioxide gas and a stream 114 of acid condensate.

The acid condensate in stream 114 is typically a mixture of sulfuric acid condensate and nitric acid condensate, with the sulfuric acid condensate typically being the predominant acid component. Stream 114 is divided into two substreams; stream 32 which leaves CPU 20 to be depressurized across the first expansion valve 34, and stream 116 which is pumped in pump 118 to produce pumped stream 120 which is then cooled by indirect heat exchange in heat exchanger 122 to produce cooled, pumped stream 124 which is then recycled to the top of column 110 to provide the aqueous acid for washing the gas.

In the embodiment depicted in FIG. 4, there is no stream of water from an external source to the top of column 110. The lack of water feed at this point is because sufficient water from the flue gas itself condenses in the 15 bar (1.5 MPa) column to enable production of the mixed acid condensate via the sour compression reactions. However, should additional water be required in other embodiments, then water could be added to the top of this column.

Stream 112 is compressed to about 30 bar (3 MPa) in compression system 126 which is part of the multistage carbon dioxide gas compression train. A stream 128 of compressed first $SO_2$-depleted carbon dioxide gas is cooled by indirect heat exchange with a coolant such as cooling water in heat exchanger 130 (which may actually be a series of heat exchangers) to produce a stream 132 of cooled, compressed first $SO_2$-depleted carbon dioxide gas which is fed to a second countercurrent gas/liquid contact column 134. The column provides additional hold up time at 30 bar (3 MPa) to allow the sour compression reactions to occur. The gas is washed in the column by direct contact with aqueous acid to produce a stream 136 of second $SO_2$-depleted carbon dioxide gas and a stream 140 of acid condensate.

The acid condensate in stream 140 is typically a mixture of sulfuric acid condensate and nitric acid condensate. Stream 140 is divided into two substreams; stream 42 which leaves the CPU 20 to be depressurized across the second expansion valve 44, and stream 142 which is pumped in pump 144 to produce pumped stream 146 which is then cooled by indirect heat exchange in heat exchanger 148 to produce cooled, pumped stream 150 which is then recycled to the top of column 134 to provide the aqueous acid for washing the gas.

The embodiment depicted in FIG. 4 is intended for removing $SO_2$ (and $NO_x$ from carbon dioxide gas containing a high concentration of $SO_2$, i.e. flue gas generated by oxyfuel combustion of coal containing a high concentration of sulfur. In this embodiment, there is insufficient water in gas feed (stream 132) to column 134 to enable production of the mixed acid condensate via the sour compression reactions at 30 bar (3 MPa). Therefore, additional water from an external source is added to the column via stream 152.

The stream 50 of desorbed carbon dioxide gas at 15 bar (1.5 MPa) may be recycled to the feed to column 110 as indicated in FIG. 4. However, it should be understood that stream 50 may be recycled to any point within the 15 bar (1.5 MPa) stage of CPU 20. For example, all or part of stream 50 may be recycled to the feed to compression system 126.

Stream 136 is then further processed as indicated by unit 138 to produce the stream 24 of purified carbon dioxide for storage or use in EOR processes, and the vent stream 26 containing the non-condensable components from the flue gas. Further processing usually involves drying the $SO_2$-depleted carbon dioxide gas and then removing the non-condensable gases either by distillation or partial condensation, to produce liquid carbon dioxide.

EXAMPLE

Computer simulations using the ASPEN™ Plus software (version 2006.5; © Aspen Technology, Inc.) have been carried out to model the process depicted in FIG. 4. The process is modeled on the basis that the feed stream 18 is at 30° C. and about 1 bar (0.1 MPa), and has a flow rate of about 147 kg/s and the following composition: 72% carbon dioxide; 16% $N_2$; 5% $O_2$; 4% water; 3% Ar; 1125 ppm $SO_2$; and 825 ppm $NO_x$.

A heat and mass balance for the process depicted in FIG. 4, calculated according to the simulation, is provided in Table 2.

It will be appreciated that the invention is not restricted to the details described above with reference to the preferred embodiments but that numerous modifications and variations can be made without departing form the spirit or scope of the invention as defined in the following claims.

TABLE 2

| Stream | | 16 | 18 | 104 | 108 | 112 | 32 | 120 | 142 | 128 | 134 |
|---|---|---|---|---|---|---|---|---|---|---|---|
| Temperature | ° C. | 30.00 | 30.00 | 307.72 | 30.00 | 30.38 | 33.62 | 33.62 | 30.00 | 94.13 | 30.00 |
| Pressure | Bar (MPa) | 1.01(0.1) | 1.01(0.1) | 15(1.5) | 15(1.5) | 15(1.5) | 15(1.5) | 15(1.5) | 15(1.5) | 30 (3) | 30 (3) |
| Flow | kg/s | 146.90 | 146.93 | 146.93 | 146.93 | 143.91 | 3.03 | 130.36 | 130.36 | 143.91 | 143.91 |
| Ar | mol % | 2.7656 | 2.7651 | 2.7651 | 2.7653 | 2.8860 | 0.0001 | 0.0001 | 0.0001 | 2.8860 | 2.8860 |
| $CO_2$ | mol % | 71.9292 | 71.9336 | 71.9336 | 71.9393 | 75.0745 | 0.2303 | 0.2303 | 0.2303 | 75.0745 | 75.0745 |
| $N_2$ | mol % | 16.0663 | 16.0632 | 16.0632 | 16.0645 | 16.7657 | 0.0010 | 0.0010 | 0.0010 | 16.7657 | 16.7657 |
| NO | ppm | 749.8231 | 749.6872 | 749.6872 | 824.3895 | 355.0547 | 0.2279 | 0.2279 | 0.2279 | 355.0547 | 355.0548 |
| $NO_2$ | ppm | 74.6514 | 74.6370 | 74.6370 | 0.0001 | 0.0005 | 0.0000 | 0.0000 | 0.0000 | 0.0005 | 0.0005 |
| $O_2$ | mol % | 4.7668 | 4.7659 | 4.7659 | 4.7661 | 4.8926 | 0.0002 | 0.0002 | 0.0002 | 4.8926 | 4.8926 |
| $N_2O_4$ | mol % | 0.0000 | 0.0000 | 0.0000 | 0.0000 | 0.0000 | 0.0000 | 0.0000 | 0.0000 | 0.0000 | 0.0000 |

TABLE 2-continued

| | | | | | | | | | | |
|---|---|---|---|---|---|---|---|---|---|---|
| HNO$_3$ | mol % | 0.0000 | 0.0000 | 0.0000 | 0.0000 | 0.0000 | 1.2061 | 1.2061 | 1.2061 | 0.0000 | 0.0000 |
| HNO$_2$ | mol % | 0.0000 | 0.0000 | 0.0000 | 0.0000 | 0.0000 | 0.0032 | 0.0032 | 0.0032 | 0.0000 | 0.0000 |
| SO$_2$ | ppm | 1124.6866 | 1124.6382 | 1124.6382 | 1046.9241 | 218.5239 | 13.6691 | 13.6691 | 13.6691 | 218.5239 | 218.5239 |
| H$_2$O | mol % | 4.2772 | 4.2773 | 4.2773 | 4.2698 | 0.3237 | 96.2713 | 96.2713 | 96.2713 | 0.3237 | 0.3237 |
| H$_2$SO$_4$ | mol % | 0.0000 | 0.0000 | 0.0000 | 0.0078 | 0.0000 | 2.2864 | 2.2864 | 2.2864 | 0.0000 | 0.0000 |

| Stream | | 136 | 42 | 146 | 150 | 152 | 50 | 52 | 40 | 28 |
|---|---|---|---|---|---|---|---|---|---|---|
| Temperature | °C. | 30.10 | 31.75 | 31.75 | 30.00 | 30.00 | 31.67 | 31.67 | 32.65 | 32.65 |
| Pressure | Bar (MPa) | 30 (3) | 30 (3) | 30 (3) | 30 (3) | 30 (3) | 15(1.5) | 15(1.5) | 1.01(0.1) | 1.01(0.1) |
| Flow | kg/s | 143.68 | 1.73 | 110.29 | 110.29 | 1.50 | 0.01 | 1.72 | 0.03 | 4.72 |
| Ar | mol % | 2.8925 | 0.0006 | 0.0006 | 0.0006 | 0.0000 | 0.2780 | 0.0000 | 0.0210 | 0.0000 |
| CO$_2$ | mol % | 75.2270 | 0.6435 | 0.6435 | 0.6435 | 0.0000 | 97.3226 | 0.4498 | 94.9992 | 0.0242 |
| N$_2$ | mol % | 16.8032 | 0.0031 | 0.0031 | 0.0031 | 0.0000 | 1.4979 | 0.0001 | 0.2215 | 0.0000 |
| NO | ppm | 12.0496 | 0.0850 | 0.0850 | 0.0850 | 0.0000 | 35.8519 | 0.0134 | 48.3922 | 0.0010 |
| NO$_2$ | ppm | 0.0000 | 0.0029 | 0.0029 | 0.0029 | 0.0000 | 0.0002 | 0.0029 | 0.0016 | 0.0011 |
| O$_2$ | mol % | 4.8669 | 0.0011 | 0.0011 | 0.0011 | 0.0000 | 0.5202 | 0.0001 | 0.0453 | 0.0000 |
| N$_2$O$_4$ | mol % | 0.0000 | 0.0000 | 0.0000 | 0.0000 | 0.0000 | 0.0000 | 0.0000 | 0.0000 | 0.0000 |
| HNO$_3$ | mol % | 0.0000 | 1.3738 | 1.3738 | 1.3738 | 0.0000 | 0.0000 | 1.3765 | 0.0004 | 1.2736 |
| HNO$_2$ | mol % | 0.0000 | 0.0017 | 0.0017 | 0.0017 | 0.0000 | 0.0000 | 0.0017 | 0.0000 | 0.0026 |
| SO$_2$ | ppm | 0.0000 | 0.0000 | 0.0000 | 0.0000 | 0.0000 | 0.0000 | 0.0000 | 874.9463 | 5.9251 |
| H$_2$O | mol % | 0.2092 | 97.1006 | 97.1006 | 97.1006 | 100.0000 | 0.3777 | 97.2944 | 4.6203 | 96.9336 |
| H$_2$SO$_4$ | mol % | 0.0000 | 0.8756 | 0.8756 | 0.8756 | 0.0000 | 0.0000 | 0.8773 | 0.0000 | 1.7653 |

The invention claimed is:

1. A method for removing sulfur dioxide (SO$_2$) from carbon dioxide feed gas comprising SO$_2$ as a contaminant, said method comprising:
    maintaining said carbon dioxide feed gas, or a SO$_2$-lean carbon dioxide gas derived therefrom, at elevated pressure(s) in a sour gas reactor system in the presence of oxygen (O$_2$), water and NO$_x$ for a period of time sufficient to convert SO$_2$ to sulfuric acid condensate and NO$_x$ to nitric acid condensate;
    separating said acid condensates from said carbon dioxide gas to produce SO$_2$-depleted, NO$_x$-lean carbon dioxide gas; and
    neutralizing at least a portion of said sulfuric acid condensate by reaction with an alkaline sorbent in an acid/sorbent reactor system to produce sorbent-derived sulfate, wherein said sour gas reactor system comprises at least one stage operating at elevated pressure and said acid/sorbent reactor system operates at a lower pressure than said elevated pressure, said lower pressure being at least 2 bar, said method comprising depressurizing said sulfuric acid condensate produced at said stage to produce reduced pressure sulfuric acid condensate and desorbed carbon dioxide gas at said lower pressure; and
    feeding said reduced pressure sulfuric acid condensate to said acid/sorbent reactor system.

2. The method of claim 1, wherein at least a portion of said nitric acid condensate is neutralized by reaction with said alkaline sorbent in said acid/sorbent reactor system to produce sorbent-derived nitrate.

3. The method of claim 1, said method comprising pretreating said feed gas by maintaining said feed gas in contact with an alkaline sorbent in a desulfurization unit in the presence of O$_2$ for a period of time at least sufficient to react said alkaline sorbent with SO$_2$ to produce said SO$_2$-lean carbon dioxide gas and a mixture of sorbent-derived sulfate and sorbent-derived sulfite, wherein said acid/sorbent reactor system is said desulfurization unit and said sulfuric acid condensate is fed to said desulfurization unit for neutralization.

4. The method of claim 1, wherein acid/sorbent reactor system is downstream of said carbon dioxide feed gas to the sour gas reactor system.

5. The method of claim 1, said method comprising
    separating said reduced pressure sulfuric acid condensate from said desorbed carbon dioxide gas prior to feeding said reduced pressure sulfuric acid condensate to said acid/sorbent reactor system.

6. The method of claim 1, said method comprising:
    compressing said desorbed carbon dioxide gas to produce compressed desorbed carbon dioxide gas at said elevated pressure; and
    recycling said compressed desorbed carbon dioxide gas to said stage of said sour gas reactor system.

7. The method of claim 5, wherein said lower pressure is from about 10 bar (1 MPa) to about 20 bar (2 MPa).

8. The method of claim 1, wherein said sour gas reactor system comprises a first stage operating at a first elevated pressure and a second stage operating at a second elevated pressure that is higher than the first elevated pressure, and said acid/sorbent reactor operates at said first elevated pressure.

9. The method of claim 8, said method comprising feeding said sulfuric acid condensate produced in said first stage of said sour gas reactor system to said acid/sorbent reactor system.

10. The method of claim 8, said method comprising:
    depressurizing said sulfuric acid condensate produced at said second stage to produce reduced pressure sulfuric acid condensate and desorbed carbon dioxide gas at said first elevated pressure;
    separating said reduced pressure sulfuric acid condensate from said desorbed carbon dioxide gas; and
    feeding said reduced pressure sulfuric acid condensate to said acid/sorbent reactor system.

11. The method of claim 10, said method comprising recycling said desorbed carbon dioxide to said first stage of said sour gas reactor system.

12. The method of claim 10, said method comprising:
    compressing said desorbed carbon dioxide gas to produce compressed desorbed carbon dioxide gas at said second elevated pressure; and
    recycling said compressed desorbed carbon dioxide gas to said second stage of said sour gas reactor system.

13. The method of claim 8, wherein said first elevated pressure is from about 10 bar (1 MPa) to about 20 bar (2 MPa).

14. The method of claim 8, said method comprising:
depressurizing said sulfuric acid condensate produced at said second stage to produce reduced pressure sulfuric acid condensate and desorbed carbon dioxide gas at said first elevated pressure; and
feeding said reduced pressure sulfuric acid condensate and desorbed carbon dioxide gas at said first elevated pressure to said acid/sorbent reactor system.

15. The method of claim 14, said method comprising:
recovering said desorbed carbon dioxide gas from said acid/sorbent reactor system; and
recycling said desorbed carbon dioxide to said first stage of said sour gas reactor system.

16. The method of claim 14, said method comprising:
recovering said desorbed carbon dioxide gas from said acid/sorbent reactor system;
compressing said desorbed carbon dioxide gas to produce compressed desorbed carbon dioxide gas at said second elevated pressure; and
recycling said compressed desorbed carbon dioxide gas to said second stage of said sour gas reactor system.

17. A method for removing $SO_2$ and $NO_x$ from carbon dioxide feed gas comprising water, $O_2$, $SO_2$ and $NO_x$ as contaminants from an oxyfuel combustion process, said method comprising:
compressing carbon dioxide feed gas, or $SO_2$-lean carbon dioxide feed gas derived therefrom, in a first compression system to produce carbon dioxide gas feed at a first elevated pressure of at least 3 bar;
maintaining said carbon dioxide gas feed, or said SO2-lean carbon dioxide feed gas derived therefrom, at said first elevated pressure in a first pressurizable reactor vessel of a sour compression reactor system for sufficient time to produce an intermediate 502-depleted carbon dioxide gas and a first acid condensate mixture of sulfuric acid condensate and nitric acid condensate;
separating said intermediate SO2-depleted carbon dioxide gas from said first acid condensate mixture;
feeding said first acid condensate mixture to an acid sorbent reactor system operating at said first elevated pressure to neutralize said first acid condensate mixture by reaction with an alkaline sorbent to produce sorbent-derived sulfate and nitrate;
compressing said intermediate SO2-depleted carbon dioxide gas in a second compression system to a second elevated pressure that is higher than the first elevated pressure;
maintaining said intermediate SO2-depleted carbon dioxide gas in the presence of water at said second elevated pressure in a second pressurizable vessel of said sour compression reactor system for sufficient time to produce SO2-depleted, NOx-lean carbon dioxide gas and a second acid condensate mixture comprising sulfuric acid condensate and nitric acid condensate;
separating said SO2-depleted, NOx-lean carbon dioxide gas from said second acid condensate mixture;
depressurizing said second acid condensate mixture to produce reduced pressure second acid condensate mixture and desorbed carbon dioxide gas at said first elevated pressure;
feeding said reduced pressure second acid condensate mixture and desorbed carbon dioxide gas at the first elevated pressure to said acid/sorbent reactor system to neutralize sulfuric acid and nitric acid in said second acid condensate mixture by reaction with said alkaline sorbent;
recovering said desorbed carbon dioxide gas from said acid/sorbent reactor system; and
recycling said desorbed carbon dioxide gas to a point within said sour gas reactor system operating at said first elevated pressure.

18. The method of claim 17, wherein the first elevated pressure is from about 10 bar to about 20 bar.

19. The method of claim 17, wherein the second elevated pressure is from about 25 bar to about 35 bar.

20. The method of claim 17, wherein the residence time in said acid/sorbent reactor system is from about 1 s to about 100 s.

21. The method of claim 17, wherein the acid/sorbent reactor operates at a temperature from about 5° C. to about 150° C.

* * * * *

UNITED STATES PATENT AND TRADEMARK OFFICE
CERTIFICATE OF CORRECTION

PATENT NO. : 8,197,778 B2  
APPLICATION NO. : 12/832095  
DATED : June 12, 2012  
INVENTOR(S) : Vincent White et al.

Page 1 of 1

It is certified that error appears in the above-identified patent and that said Letters Patent is hereby corrected as shown below:

Column 27, Line 31

In claim 17 delete "SO2-lean" and insert -- $SO_2$-lean --

Column 27, Line 35

In claim 17 delete "5O2-depleted" and insert -- $SO_2$-depleted --

Column 27, Line 38

In claim 17 delete "SO2-depleted" and insert -- $SO_2$-depleted --

Column 28, Line 4

In claim 17 delete "SO2-depleted" and insert -- $SO_2$-depleted --

Column 28, Line 8

In claim 17 delete "SO2-depleted" and insert -- $SO_2$-depleted --

Column 28, Line 12

In claim 17 delete "SO2-depleted" and insert -- $SO_2$-depleted --

Column 28, Line 15

In claim 17 delete "SO2-depleted" and insert -- $SO_2$-depleted --

Signed and Sealed this  
Twenty-seventh Day of November, 2012

David J. Kappos  
*Director of the United States Patent and Trademark Office*